(12) United States Patent
Lee

(10) Patent No.: US 11,256,293 B2
(45) Date of Patent: Feb. 22, 2022

(54) DISPLAY DEVICE

(71) Applicant: Samsung Display Co., Ltd., Yongin-Si (KR)

(72) Inventor: Jungil Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 33 days.

(21) Appl. No.: 16/924,707

(22) Filed: Jul. 9, 2020

(65) Prior Publication Data

US 2021/0124393 A1 Apr. 29, 2021

(30) Foreign Application Priority Data

Oct. 24, 2019 (KR) ........................ 10-2019-0133137

(51) Int. Cl.
*G06F 1/16* (2006.01)
*G09F 9/30* (2006.01)

(52) U.S. Cl.
CPC .......... *G06F 1/1616* (2013.01); *G06F 1/1681* (2013.01); *G09F 9/301* (2013.01)

(58) Field of Classification Search
CPC combination set(s) only.
See application file for complete search history.

(56) References Cited

U.S. PATENT DOCUMENTS

| | | | |
|---|---|---|---|
| 9,250,733 B2 * | 2/2016 | Lee | H04M 1/022 |
| 9,470,404 B2 | 10/2016 | Lee et al. | |
| 9,992,888 B2 * | 6/2018 | Moon | H05K 5/0086 |
| 10,433,438 B2 * | 10/2019 | Moon | H05K 5/0226 |
| 10,775,852 B2 * | 9/2020 | Kim | G06F 1/1681 |
| 10,827,633 B2 * | 11/2020 | Yoo | H05K 7/1427 |
| 10,856,430 B2 * | 12/2020 | Yoo | H01Q 1/2266 |
| 10,945,346 B2 * | 3/2021 | Moon | H05K 5/0017 |
| 11,032,929 B2 * | 6/2021 | Yoo | G06F 1/1616 |
| 11,061,445 B2 * | 7/2021 | Kim | G06F 1/1641 |
| 11,073,863 B2 * | 7/2021 | Kim | G06F 1/1652 |
| 2013/0216740 A1 * | 8/2013 | Russell-Clarke | B23K 26/38 428/33 |

(Continued)

FOREIGN PATENT DOCUMENTS

| | | |
|---|---|---|
| KR | 10-1801357 | 12/2017 |
| KR | 10-1834793 | 3/2018 |

(Continued)

*Primary Examiner* — Lisa Lea-Edmonds
(74) *Attorney, Agent, or Firm* — F. Chau & Associates, LLC

(57) ABSTRACT

A display device includes: a display panel including a folding area; a supporter disposed on the display panel, wherein the supporter includes a plurality of support bars that are arranged in a first direction and extend in a second direction intersecting the first direction; a hinge disposed on the supporter, wherein the hinge has a folding axis that overlaps the folding area and extends in the second direction; and a plurality of first magnetic units and a plurality of second magnetic units disposed on the supporter, wherein the first magnetic units and the second magnetic units overlap the folding area, wherein the first magnetic units and the second magnetic units are staggered with respect to each other, wherein the folding axis is between the first magnetic units and the second magnetic units.

20 Claims, 19 Drawing Sheets

(56) References Cited

U.S. PATENT DOCUMENTS

| | | | | |
|---|---|---|---|---|
| 2016/0085271 A1* | 3/2016 | Morrison | ............... | G06F 1/1652 |
| | | | | 361/679.27 |
| 2016/0378203 A1* | 12/2016 | Kim | ....................... | G06F 1/1675 |
| | | | | 345/156 |
| 2018/0110139 A1* | 4/2018 | Seo | ....................... | H05K 5/0226 |
| 2019/0036068 A1 | 1/2019 | Kim et al. | | |
| 2019/0306290 A1 | 10/2019 | Lee et al. | | |
| 2020/0236826 A1* | 7/2020 | Baek | ..................... | H05K 5/0017 |
| 2020/0387195 A1* | 12/2020 | Kim | ....................... | G06F 1/1618 |
| 2021/0076511 A1* | 3/2021 | Yang | ........................ | G09F 9/301 |
| 2021/0116969 A1* | 4/2021 | Yu | ....................... | H01L 51/5237 |

FOREIGN PATENT DOCUMENTS

| | | |
|---|---|---|
| KR | 10-2018-0131143 | 12/2018 |
| KR | 10-2019-0065641 | 6/2019 |

\* cited by examiner

DISPLAY DEVICE

CROSS-REFERENCE TO RELATED APPLICATION

This U.S. non provisional application claims priority under 35 U.S.C. § 119 to Korean Patent Application No. 10-2019-0133137 filed on Oct. 24, 2019, in the Korean Intellectual Property Office, the disclosure of which is incorporated by reference herein in its entirety.

TECHNICAL FIELD

The present invention relates to a display device, and more particularly, to a display device including a display panel with a folding area.

DISCUSSION OF THE RELATED ART

Electronic products such as smart phones, digital cameras, laptop computers, navigation systems, and smart televisions include a display device to display an image to users. The display device generates an image and provides users with the image by displaying the image on a display screen.

To provide a better user experience with display devices, various types of display devices have recently been under development A typical example of such display devices is a flexible display device that can be deformed, folded, or rolled. The flexible display devices capable of being deformed in various shapes allow for increased portability and convenience for users.

Among the flexible display devices, the foldable display device typically includes a display module that is foldable about a folding axis extending in one direction. However, damage may be caused to the foldable display device as a result of deformation at a folding area of the foldable display device.

SUMMARY

According to an embodiment of the present invention, a display device includes: a display panel including a folding area; a supporter disposed on the display panel, wherein the supporter includes a plurality of support bars that are arranged in a first direction and extend in a second direction intersecting the first direction; a hinge disposed on the supporter, wherein the hinge has a folding axis that overlaps the folding area and extends in the second direction; and a plurality of first magnetic units and a plurality of second magnetic units disposed on the supporter, wherein the first magnetic units and the second magnetic units overlap the folding area, wherein the first magnetic units and the second magnetic units are staggered with respect to each other, wherein the folding axis is between the first magnetic units and the second magnetic units.

In an embodiment of the present invention, the first magnetic units and the second magnetic units are arranged in the second direction.

In an embodiment of the present invention, the display device further includes a plurality of third magnetic units that are adjacent to the second magnetic units, wherein the second magnetic units and the third magnetic units are staggered with respect to each other.

In an embodiment of the present invention, the support bars include a metal material.

In an embodiment of the present invention, the display panel further includes a first non-folding area and a second non-folding area, wherein the folding area is disposed between the first non-folding area and the second non-folding area, and the supporter further includes a first supporter and a second supporter that respectively overlap the first non-folding area and the second non-folding area, wherein the support bare are disposed between the first supporter and the second supporter.

In an embodiment of the present invention, the hinge includes: a first hinge is disposed on the first supporter, wherein the first magnetic units are disposed on the first hinge; a second hinge which is disposed on the second supporter, wherein the second magnetic units are disposed on the second hinge, wherein the second hinge and the first hinge are rotatably coupled to each other to form the folding axis; and a third hinge disposed on the second supporter, wherein the third hinge is spaced apart from the first hinge and is slidably coupled in the first direction to the second hinge.

In an embodiment of the present invention, the first supporter is connected to the first hinge, and the second supporter is connected to the third hinge.

In an embodiment of the present invention, the display device further includes: a plurality of first protrusions that protrude from a first side of the first hinge, wherein the first side of the first hinge faces the second hinge; a plurality of second protrusions that protrude from a first side of the second hinge, wherein the first side of the second hinge faces the first side of the first hinge; a plurality of first rotating couplers that protrude from the first side of the first hinge; and a plurality of second rotating couplers that protrude from the first side of the second hinge, wherein the first protrusions are between the second protrusions, and wherein the first rotating couplers are rotatably coupled to the second rotating couplers, respectively.

In an embodiment of the present invention, ends of the first protrusions have convexly curved surfaces that are symmetrical to convexly curved surfaces of ends of the second protrusions, with respect to a line extending between the ends of the first protrusions and the second protrusions.

In an embodiment of the present invention, the first magnetic units are in a plurality of first recessions formed in a bottom surface of the first hinge, wherein the bottom surface of the first hinge is adjacent to the first side of the first hinge.

In an embodiment of the present invention, the display device further includes a first cover that is disposed on the first hinge and covers the first magnetic units.

In an embodiment of the present invention, the second magnetic units are in a plurality of second recessions formed in a bottom surface of the second hinge, wherein the bottom surface of the second hinge is adjacent to the first side of the second hinge.

In an embodiment of the present invention, the first recessions overlap the first protrusions, and the second recessions overlap the second protrusions.

In an embodiment of the present invention, the display device further includes a second cover that is disposed on the second hinge and covers the second magnetic units.

In an embodiment of the present invention, the second hinge includes: a first part adjacent to the first hinge and including a first side and a second side opposite the first side, wherein the first side of the first part faces the first hinge; and a second part that extends in the first direction from the second side of the first part, wherein the third hinge is slidably coupled to the second part of the second hinge, a top surface of the first part is higher than a top surface of the second part, and a boundary between the top surfaces of the first and second parts faces a side surface of the third hinge.

In an embodiment of the present invention, a portion of the second part is in a second groove in a bottom surface of the third hinge.

In an embodiment of the present invention, the display device further includes a plurality of elastic units disposed in a groove formed in a first side of the second part and in the second groove, wherein the first side of the second part, opposite to the second side of the first part, is disposed in the second groove.

In an embodiment of the present invention, the display device further includes a third cover disposed on the third hinge and covering the elastic units and the second part of the second hinge disposed in the second groove of the third hinge.

In an embodiment of the present invention, the display device further includes a sliding unit disposed in a sliding hole that is formed in the second part of the second hinge and extends in the first direction, wherein the sliding unit is disposed between the third hinge and the third cover and is connected to the third hinge and the third cover.

In an embodiment of the present invention, the hinge folds the supporter and the display panel about the folding axis such that a display surface faces away from itself, wherein the display surface is a top surface of the display panel.

DETAILED DESCRIPTION OF THE EMBODIMENTS

Figure 1:
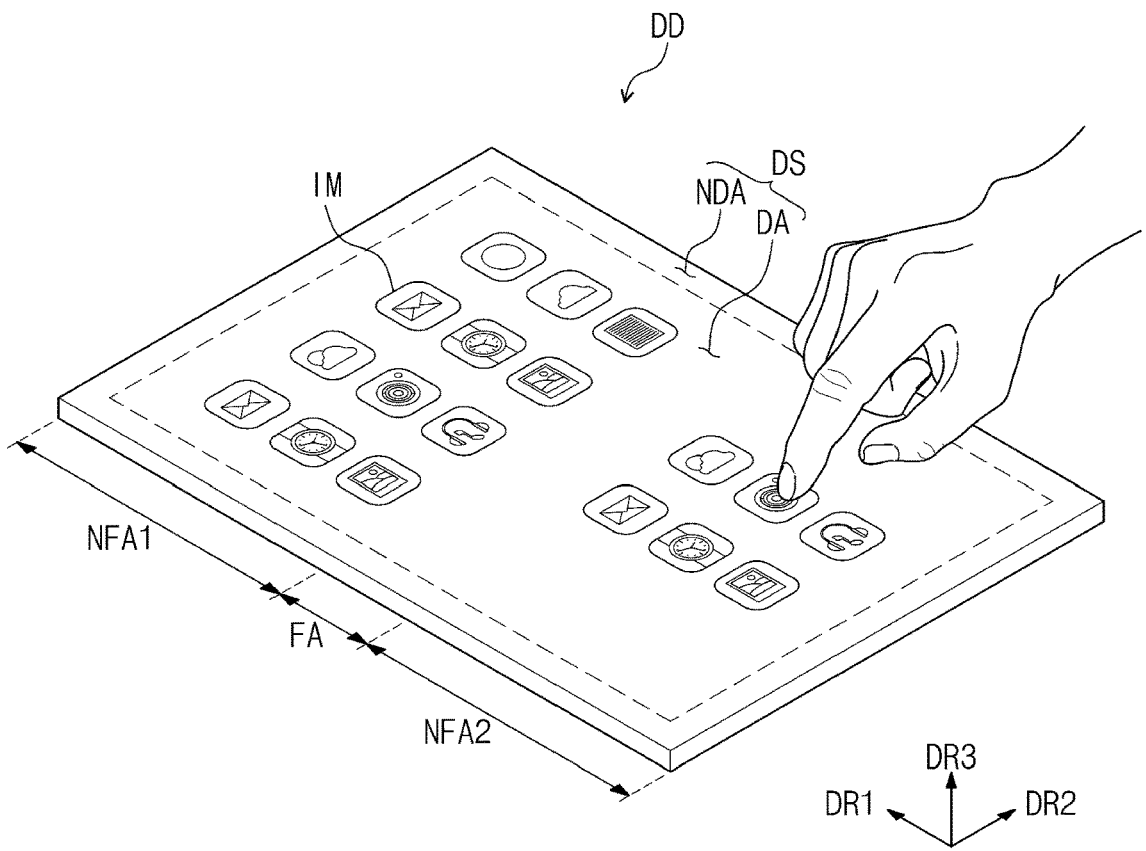
FIG. 1 illustrates a perspective view showing a display device according to an embodiment of the present invention.

In this specification, it will be understood that when a certain component (or region, layer, portion, etc.) is referred to as being "on", "connected to", or "coupled to" other component(s), the certain component (or region, layer, portion, etc.) may be directly disposed on, directly connected to, or directly coupled to the oilier component(s) or at least one intervening component may be present therebetween.

It is to be understood that like reference numerals may indicate like components throughout the specification. Moreover, in the drawings, thicknesses, ratios, and dimensions of components may be exaggerated for clarity.

The term "and/or" includes any and all combinations provided by related components.

It will be understood that, although the terms "first", "second", etc. may be used herein to describe various components these components should not be limited by these terms. These terms are only used to distinguish one component from another component. For example, a first component could be termed a second component, and vice versa without departing from the spirit and scope of the present invention. Unless referred to the contrary, the singular forms are intended to include the plural forms as well.

In addition, spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, in the example, terms "below" and "beneath" may encompass both an orientation of above, below and beneath. The device may be otherwise oriented (e.g., rotated 90 degrees or at other orientations) and the spatially relative descriptors used herein may be interpreted accordingly.

The following will now describe embodiments of the present invention with reference to the accompanying drawings.

Figure 2:
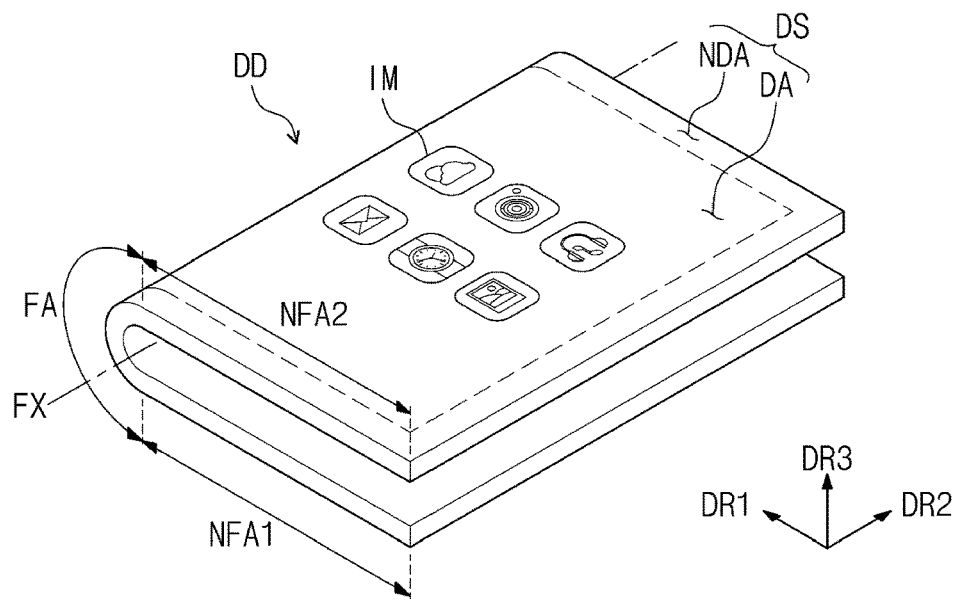
FIG. 2 illustrates a perspective view showing a folded state of the display device depicted in FIG. 1.

FIG. 1 illustrates a perspective view showing a display device according to an embodiment of the present invention. FIG. 2 illustrates a perspective view showing a folded state of the display device depicted in FIG. 1.

Referring to FIG. 1, a display device DD according to an embodiment of the present invention may have a rectangular shape with long sides that extend in a first direction DR1 and short sides that extend in a second direction DR2 intersecting the first direction DR1. However, the present invention is not limited thereto, and the display device DD may have any suitable shape, such as a circular shape or a polygonal shape. The display device DD may be a flexible display device.

A third direction DR3 is a direction that vertically intersects a plane formed by the first and second directions DR1 and DR2. In this description, the phrase "when viewed in plan" may mean "when viewed in the third direction DR3" or from above.

The display device DD may include a first non-folding area NFA1, a second non-folding area NFA2, and a folding area FA disposed between the first non-folding area NFA1 and the second non-folding area NFA2. The first non-folding area NFA1, the second non-folding area NFA2, and the folding area FA may be arranged in the first direction DR1.

Although one folding area FA and two non-folding areas NFA1 and NFA2 are illustrated, the present invention is not united thereto. For example, limitations are not imposed on the number of folding areas FA or the number of the non-folding areas NFA1 and NFA2. For example, the display device DD may include more than two non-folding areas and a plurality of folding areas disposed between the non-folding areas.

The display device DD may have a top surface that is a display surface DS on which an image is displayed. In addition, the display surface DS has a plane formed by the first direction DR1 and the second direction DR2. The display surface DS may provide users with images IM generated from the display device DD.

The display surface DS may include a display area DA and a non-display area NDA around the display area DA. The display area DA may display the images IM, but the non-display area NDA may not display the images IM. The non-display area NDA may at least partially surround the display area DA and may provide the display device DD with an edge printed with a certain color.

Referring to FIG. 2, the display device DD may be a foldable display device that can be folded or unfolded. For example, the folding area FA may bend about a folding axis FX parallel to the second direction DR2, and in turn the display device DD may become folded. The folding axis FX may be a minor axis extending parallel to the short side of the display device DD.

The display device DD may fold outwards to expose the display surface DS externally. Therefore, when the display device DD is folded, the first non-folding area NFA1 and the second non-folding area NFA2 may be disposed to cause their display surfaces to face opposite directions of each other, for example, the respective display surfaces of the first non-folding area NFA1 and the second non-folding area NFA2 would face away from each other.

Figure 3:
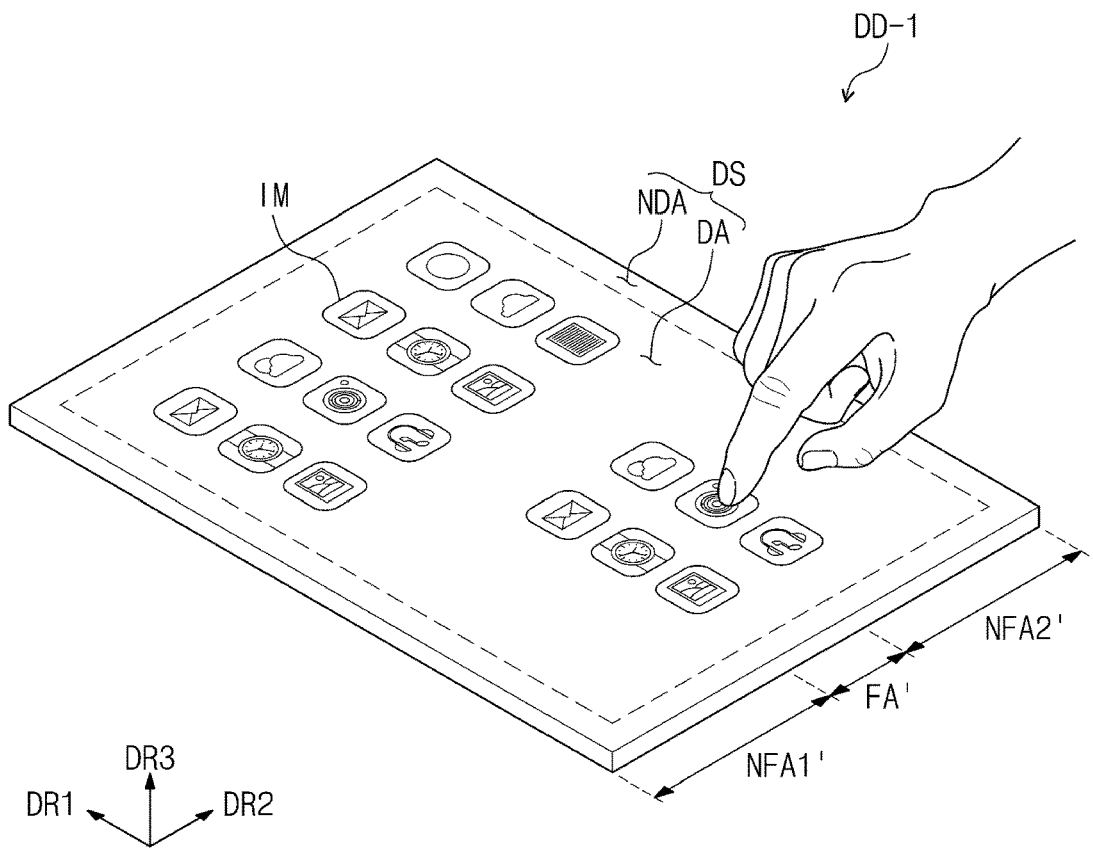
FIG. 3 illustrates a perspective view showing a display device according to an embodiment of the present invention.
Figure 4:
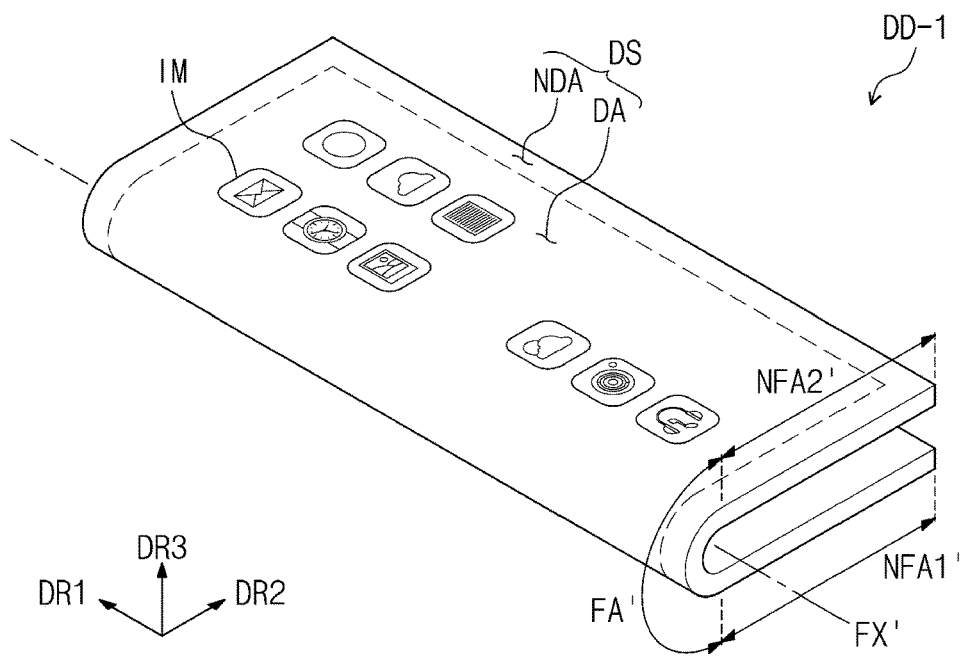
FIG. 4 illustrates a perspective view showing a folded state of the display device depicted in FIG. 3.

FIG. 3 illustrates a perspective view showing a display device according to an embodiment of the present invention. FIG. 4 illustrates a perspective view showing a folded state of the display device depicted in FIG. 3.

Except for the folding operation, a display device DD_1 of FIG. 3 may have substantially the same configuration as that of the display device DD of FIG. 1. The following will thus mainly describe a folding operation of the display device DD_1.

Referring to FIGS. 3 and 4, the display device DD_1 may include a first non-folding area NFA1', a second non-folding area NFA2', and a folding area FA' disposed between the first non-folding area NFA1' and the second non-folding area NFA2'. The first non-folding area NFA1', the second non-folding area NFA2', and the folding area FA' may be arranged in the second direction DR2.

The folding area FA' may bend about a folding axis FX' parallel to the first direction DR1, and in turn the display device DD_1 may become folded. The folding axis FX' may be a major axis extending parallel to the long side of the display device DD_1. The display device DD of FIG. 1 may be foldable about the minor axis thereof, but the display device DD_1 of FIG. 3 may be foldable about the major axis thereof. The display device DD_1 may fold outwards to expose the display surface DS externally.

The following will discuss a configuration of the display device DD that is foldable about the minor axis, but the subsequent following discussion may also be applicable to the display device DD_1 that is foldable about the major axis.

Figure 5:
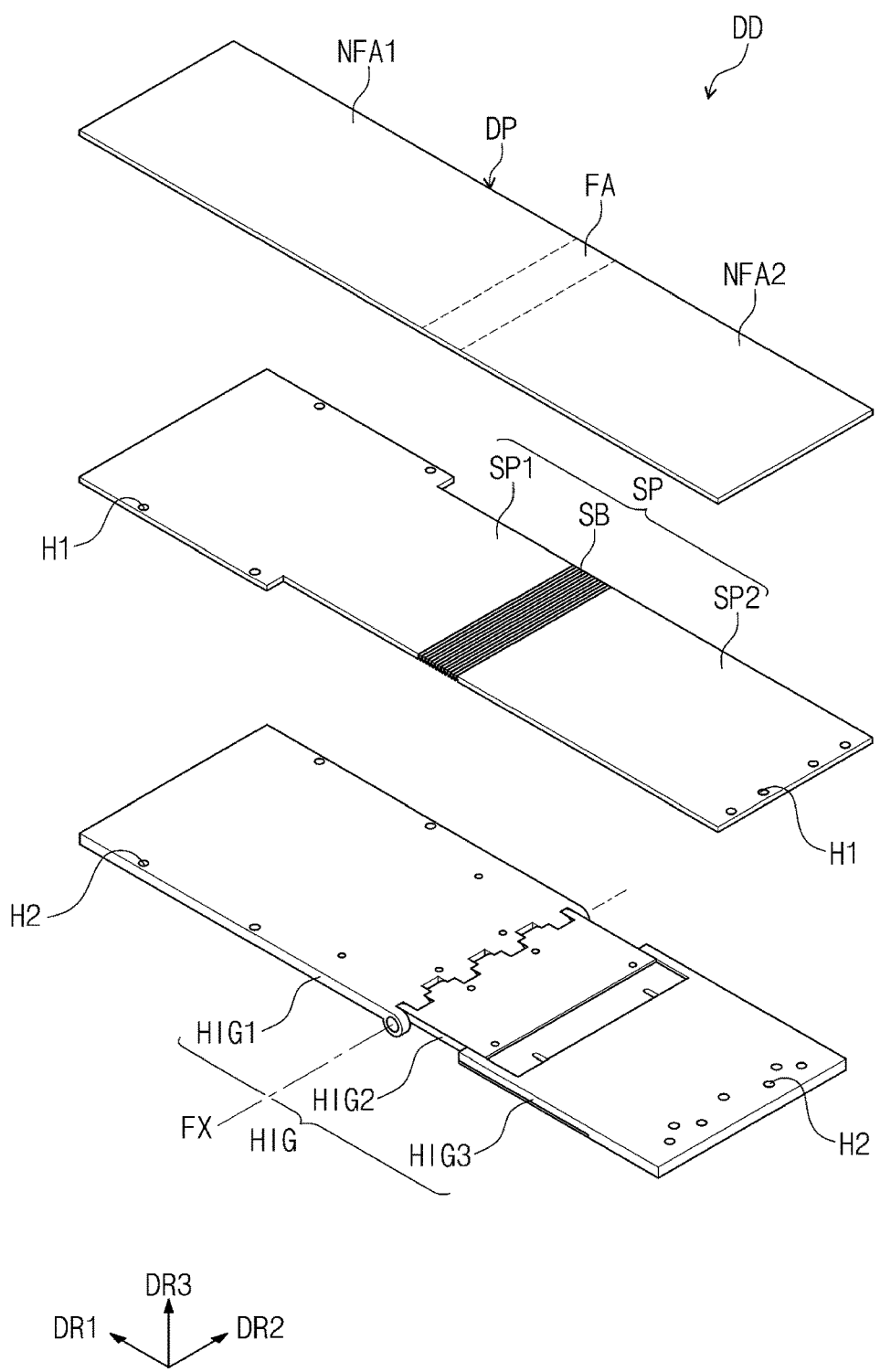
FIG. 5 illustrates an exploded perspective view showing the display device depicted in FIG. 1.

FIG. 5 illustrates an exploded perspective view showing the display device depicted in FIG. 1.

Referring to FIG. 5, the display device DD may include a display panel DP, a supporter SP disposed below the display panel DP, and a hinge HIG disposed below the supporter SP. As discussed above, the display panel DP may include a first non-folding area NFA1, a second non-folding area NFA2, and a folding area FA. For example, the folding area FA may be disposed closer to a right-side portion than to a left-side portion of the display panel DP.

The supporter SP may be disposed under the display panel DP to support the display panel DP. For example, the supporter SP may be a supporting plate. The supporter SP may be connected to the display panel DP. For example, the supporter SP may be attached to a bottom surface, opposite to a top surface, of the display panel DP. For example, the supporter SP and the display panel DP may be attached to each other with an adhesive disposed therebetween. The adhesive may include a pressure sensitive adhesive or any suitable adhesive, but the present invention is not limited thereto.

The supporter SP may be connected to the hinge HIG. For example, a plurality of screws may connect the supporter SP to the hinge HIG. Screws may be inserted into first holes H1 provided at an edge of the supporter SP and into second holes H2 provided at an edge of the hinge HIG, which may result in a connection between the supporter SP and the hinge HIG.

The supporter SP may include metal that may be attracted to a magnet. For example, the supporter SP may include magnetically attracted iron or stainless steel (e.g., SUS430). The supporter SP may have a thickness ranging from about 0.1 mm to about 0.4 mm.

The supporter SP may include a first supporter SP1, a second supporter SP2, and a plurality of support bars SB disposed between the first supporter SP1 and the second supporter SP2. The first supporter SP1, the second supporter SP2, and the plurality of support bars SB may be arranged in the first direction DR1.

The first supporter SP1 may be disposed below and may overlap the first non-folding area NFA1. The second supporter SP2 may be disposed below and may overlap the second non-folding area NFA2. The support bars SB may be disposed below and may overlap the folding area FA. The support bars SB may be arranged in the first direction DR1, while extending in the second direction DR2.

The hinge HIG may overlap the folding axis FX that extends in the second direction DR2. The folding axis FX may overlap the folding area FA. The hinge HIG may be foldable about the folding axis FX. The folding of the hinge HIG may induce folding of the supporter SP connected to the hinge HIG and folding of the display panel DP connected to the supporter SP.

The hinge HIG may include a first hinge HIG1, a second hinge HIG2, and a third hinge HIG3. The first hinge HIG1 may be disposed below and may overlap the first supporter SP1. The second and third hinges HIG2 and HIG3 may be disposed below and may overlap the second supporter SP2.

The second hinge HIG2 and the first hinge HIG1 may be rotatably coupled to each other to form the folding axis FX. The third hinge HIG3 may be spaced apart from the first hinge HIG1 and connected to the second hinge HIG2. The third hinge HIG3 may be slidably coupled in the first direction DR1 to the second hinge HIG2. This configuration will be further discussed in detail below.

The first supporter SP1 may be connected to the first hinge HIG1, and the second supporter SP2 may be connected to the third hinge HIG3. For example, screws may be inserted into the first holes H1 that are formed in the first and second supporters SP1 and SP2 and into the second holes H2 that are formed in the first and third hinges HIG1 and HIG3, and accordingly the first and second supporters SP1 and SP2 may be respectively connected to the first and third hinges HIG1 and HIG3.

Figure 6:
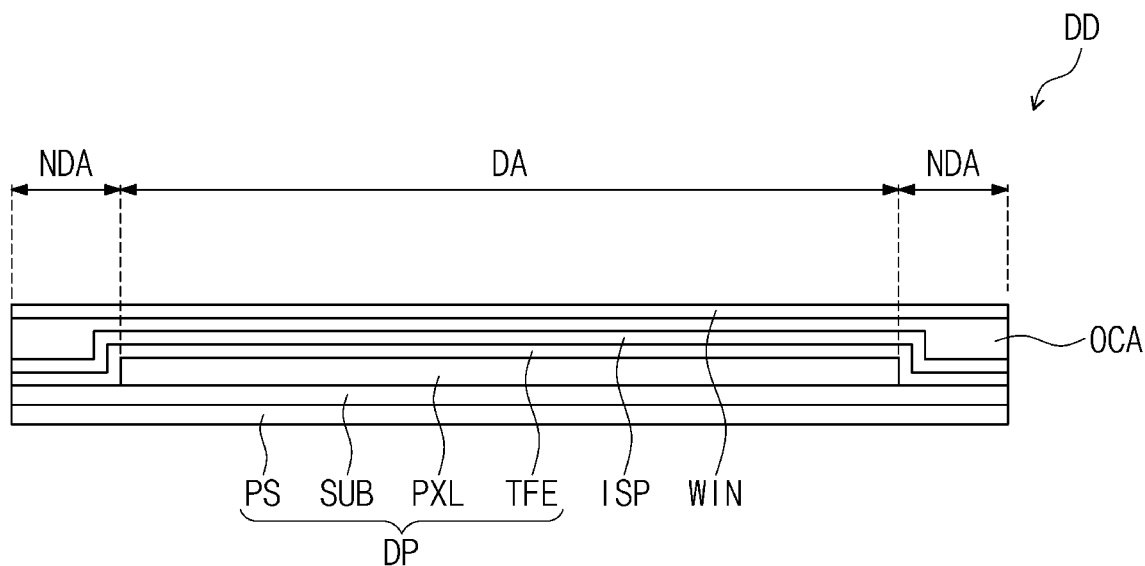
FIG. 6 illustrates a cross-sectional view of a display panel depicted in FIG. 5.

FIG. 6 illustrates a cross-sectional view showing the display panel depicted in FIG. 5.

Referring to FIG. 6, the display device DD according to an embodiment of the present invention may further include an input sensing part ISP disposed on the display panel DP, a window WIN disposed on the input sensing part ISP, and an adhesive OCA disposed between the input sensing part ISP and the window WIN.

The display panel DP according to an embodiment of the present invention may be, for example, an emissive type display panel. For example, the display panel DP may be an organic light emitting display panel or a quantum-dot light emitting display panel. An emission layer of the organic light emitting display panel may include an organic light emitting material. An emission layer of the quantum-dot light emitting display panel may include a quantum-dot or a quantum-rod. The following will discuss an example in which an organic light emitting display panel is used as the display panel DP.

The display panel DP may include a substrate SUB, a pixel layer PXL disposed on the substrate SUB, a thin-film encapsulation layer TFE disposed on the substrate SUB to cover the pixel layer PXL, and a protective substrate PS disposed below the substrate SUB. For example, the substrate SUB may include a transparent flexible plastic substrate. For example, the substrate SUB may include polyimide (PI).

Similar to the display surface DS of the display device DD, the substrate SUB may include a display area DA and a non-display area NDA adjacent to the display area DA. The pixel layer PXL may be disposed on the display area DA. The pixel layer PXL may include a plurality of pixels, and each of the pixels may include a light emitting element.

The thin-film encapsulation layer TFE may include at least two inorganic layers and an organic layer that is disposed between the inorganic layers. The inorganic layers may include an inorganic material, and may protect the pixel layer PXL against moisture and/or oxygen. The organic layer may include an organic material, and may protect the pixel layer PXL against foreign substances such as dust particles.

The protective substrate PS may protect a lower portion of the substrate SUB. For example, the protective substrate PS may include a flexible plastic substrate. For example, the protective substrate PS may include polyethylene terephthalate (PET).

The input sensing part ISP may detect an external input (e.g., user's hands or a touch pen), may convert the external input into an input signal, and may provide the display panel DP with the input signal so that the display panel DP can display a response to the external input. The input sensing part ISP may include a plurality of sensors to detect the external input. For example, the sensors may use a capacitive type method to detect the external input. The display pane. DP may receive the input signal from the input sensing part ISP and may then generate an image corresponding to the input signal.

The window WIN may protect the display panel DP and the input sensing part ISP against external scratches and impacts. The window WIN may be attached through the adhesive OCA to the input sensing part ISP. The adhesive OCA may include an optical clear adhesive. An image generated from the display panel DP may pass through the window WIN and then may be provided to users.

Figure 7:
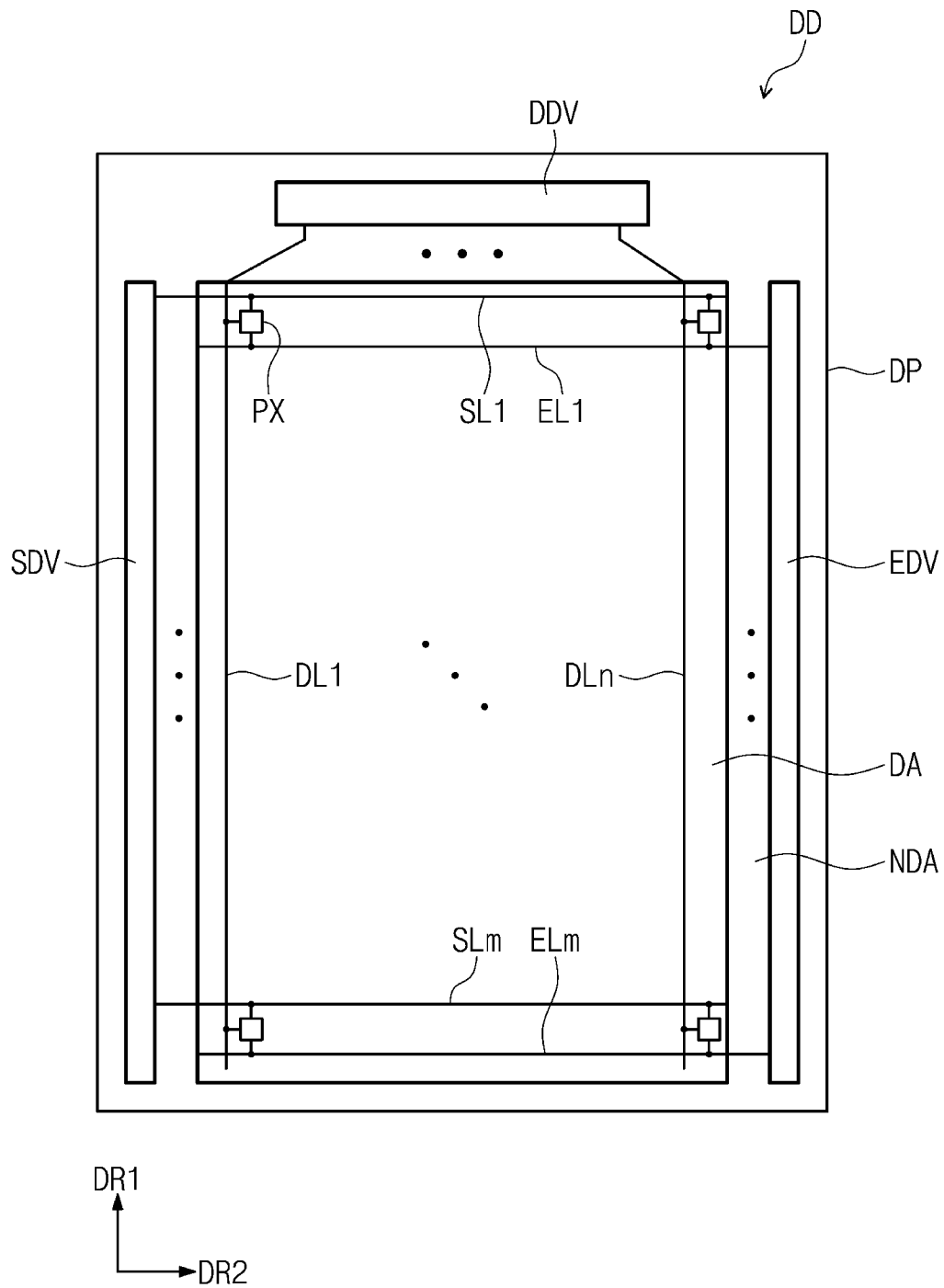
FIG. 7 illustrates a plan view showing the display panel depicted in FIG. 6.

FIG. 7 illustrates a plan view showing the display panel depicted in FIG. 6.

Referring to FIG. 7, the display device DD according to an embodiment of the present invention may include the display panel DP, a scan driver SDV, a data driver DDV, and an emission driver EDV.

The display panel DP may be a flexible display panel. The display panel DP may have a rectangular shape with long sides that extend in the first direction DR1 and short sides that extend in the second direction DR2. The display panel DP may include a display area DA and a non-display area NDA that at least partially surrounds the display area DA.

The display panel DP may include a plurality of pixels PX, a plurality of scan lines SL1 to SLm, a plurality of data lines DL1 to DLn, and a plurality of emission lines EL1 to ELm. The subscripts "m" and "n" are natural numbers. The pixels PX may be disposed on the display area DA, and may be connected to the scan lines SL1 to SLm, the data lines DL1 to DLn, and the emission lines EL1 to ELm.

The scan driver SDV, the data driver DDV, and the emission driver EDV may be disposed on the non-display area NDA. The scan driver SDV and the emission driver EDV may be disposed adjacent to corresponding long sides of the display panel DP. For example, the emission driver EDV and the scan driver SDV may each be disposed at opposing sides of the display device DD. However, the present invention is not limited thereto.

The data driver DDV may be fabricated in the form of an integrated circuit chip and may be disposed adjacent to one of the short sides of the display panel DP. However, the present invention is not limited thereto, and the data driver DDV may be mounted on a flexible circuit board and thus may be connected through the flexible circuit board to the display panel DP.

The scan lines SL1 to SLm may extend in the second direction DR2 and may have connection with the scan driver SDV. The data lines DL1 to DLn may extend in the first direction DR1 and may have connection with the data driver DDV. The emission lines EL1 to ELm may extend in the second direction DR2 and may have connection with the emission driver EDV.

The scan driver SDV may generate a plurality of scan signals, and the scan signals may be applied through the scan lines SL1 to SLm to the pixels PX. The scan signals may be sequentially applied to the pixels PX. The data driver DDV may generate a plurality of data voltages, and the data voltages may be applied through the data lines DL1 to DLn to the pixels PX. The emission driver EDV may generate a plurality of light emission signals, and the light emission signals may be applied through the emission lines EL1 to ELm to the pixels PX.

The display device DD may further include a timing controller that controls operations of the scan driver SDV, the data driver DDV, and the emission driver EDV.

In response to the scan signals, the data voltages may be provided to the pixels PX. In response to the emission signals, the pixels PX may emit light corresponding to the data voltages, thereby displaying an image. The light emission signals may control light emission timing of the pixels PX.

Figure 8:
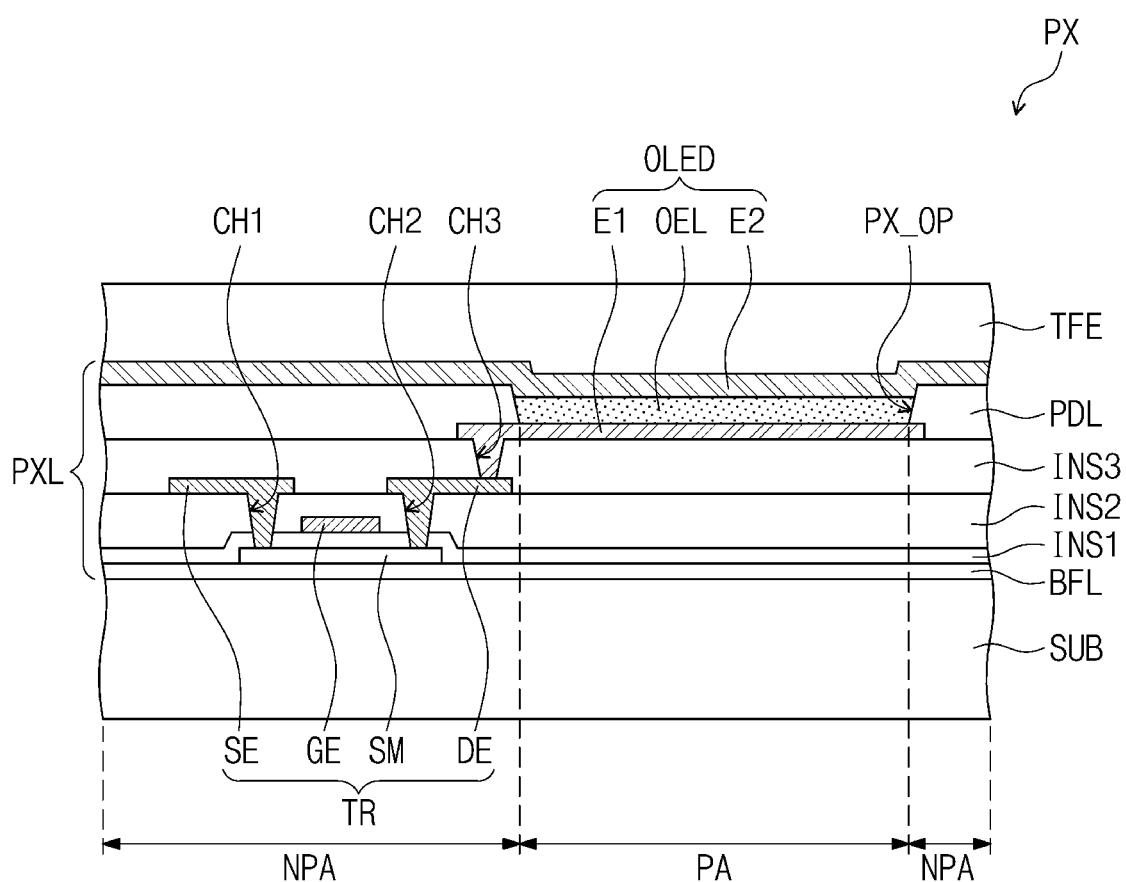
FIG. 8 illustrates a cross-sectional view showing a pixel depicted in FIG. 7.

FIG. 8 illustrates a simplified cross-sectional view showing the pixel depicted in FIG. 7.

Referring to FIG. 8, the pixel PX may include an organic light emitting element OLED and a transistor TR connected to the organic light emitting element OLED. The organic light emitting element OLED may include a first electrode E1, a second electrode E2, and an organic emission layer OEL between the first and second electrodes E1 and E2.

The first electrode E1 may be an anode electrode, and the second electrode E2 may be a cathode electrode. For example, the first electrode E1 may be a pixel electrode, and the second electrode E2 may be a common electrode.

The pixel PX may include a pixel area PA and a non-pixel area NPA in the vicinity of the pixel area PA. The organic light emitting element OLED may be disposed on the pixel area PA, and the transistor TR may he disposed on the non-pixel area NPA. The transistor TR and the organic light emitting element OLED may be disposed on the substrate SUB. A buffer layer BFL may be disposed on the substrate SUB, and the buffer layer BFL may include an inorganic material.

The buffer layer BFL may lie provided on the substrate SUB, and a semiconductor layer SM of the transistor TR may be disposed on the buffer layer BFL. The semiconductor layer SM may include an organic semiconductor or an inorganic semiconductor such as amorphous silicon or polycrystalline silicon. In addition, the semiconductor layer SM may include an oxide semiconductor. The semiconductor layer SM may include a source region, a drain region, and a channel region between the source and drain regions.

A first insulating layer INS1 that covers the semiconductor layer SM may be disposed on the buffer layer BFL. The first insulating layer INS1 may include an inorganic material. A gate electrode GE of the transistor TR may be disposed on the first insulating layer INS1. and the gate electrode GE overlaps the semiconductor layer SM. The gate electrode GE may be disposed to overlap the channel region of the semiconductor layer SM.

A second insulating layer INS2 that covers the gate electrode GE may be disposed on the first insulating layer INS1. The second insulating layer INS2 may include one or more of an organic material and/or an inorganic material.

A source electrode SE and a drain electrode DE of the transistor TR may be disposed spaced apart from each other on the second insulating layer INS2. The source electrode SE may be connected to the source region of the semiconductor layer SM through a first contact hole CH1 formed in the first and second insulating layers INS1 and INS2. The drain electrode DE may be connected to the drain region of the semiconductor layer SM through a second contact hole CH2 formed in the first and second insulating layers INS1 and INS2.

The third insulating layer INS3 that covers the source and drain electrodes SE and DE of the transistor TR may be disposed on the second insulating layer INS2. The third insulating layer INS3 may be a planarized layer that provides a flat top surface, and may include an organic material.

The first electrode E1 may be disposed on the third insulating layer INS3. The first electrode E1 may be connected to the drain electrode DE of the transistor TR through a third contact hole CH3 formed in the third insulating layer INS3.

A pixel definition layer PDL that exposes a portion of the first electrode E1 may be disposed on the third insulating layer INS3. The pixel definition layer PDL may have an opening PX_OP that exposes the portion of the first electrode E1.

The organic emission layer OEL may be disposed on the first electrode E1 and in the opening PX_OP. The organic emission layer OEL may generate light of a color selected from one of red. green, and blue. However, the present invention is not limited thereto, and the organic emission layer OEL may generate white light from a combination of organic materials that produce red. green, and blue colors.

The second electrode E2 may be disposed on the pixel definition layer PDL and the organic emission layer OEL. The thin-film encapsulation layer TFE that covers the pixel PX may be disposed on the organic light emitting element OLED. The pixel layer PXL may refer to a layer between the substrate SUB and the thin-film encapsulation layer TFE.

A first voltage (ELVDD) may be applied to the first electrode E1, and a second voltage (ELVSS) may be applied to the second electrode E2. Holes and electrons, from the first electrode E1 and the second electrode E2, injected into the organic emission layer OEL may combine with each other to produce excitons, and the organic light emitting element OLED may emit light as the excitons return to ground state. The organic light emitting element OLED may emit a red light, a green light, or a blue light based on current flow, thereby displaying an image.

Figure 9:
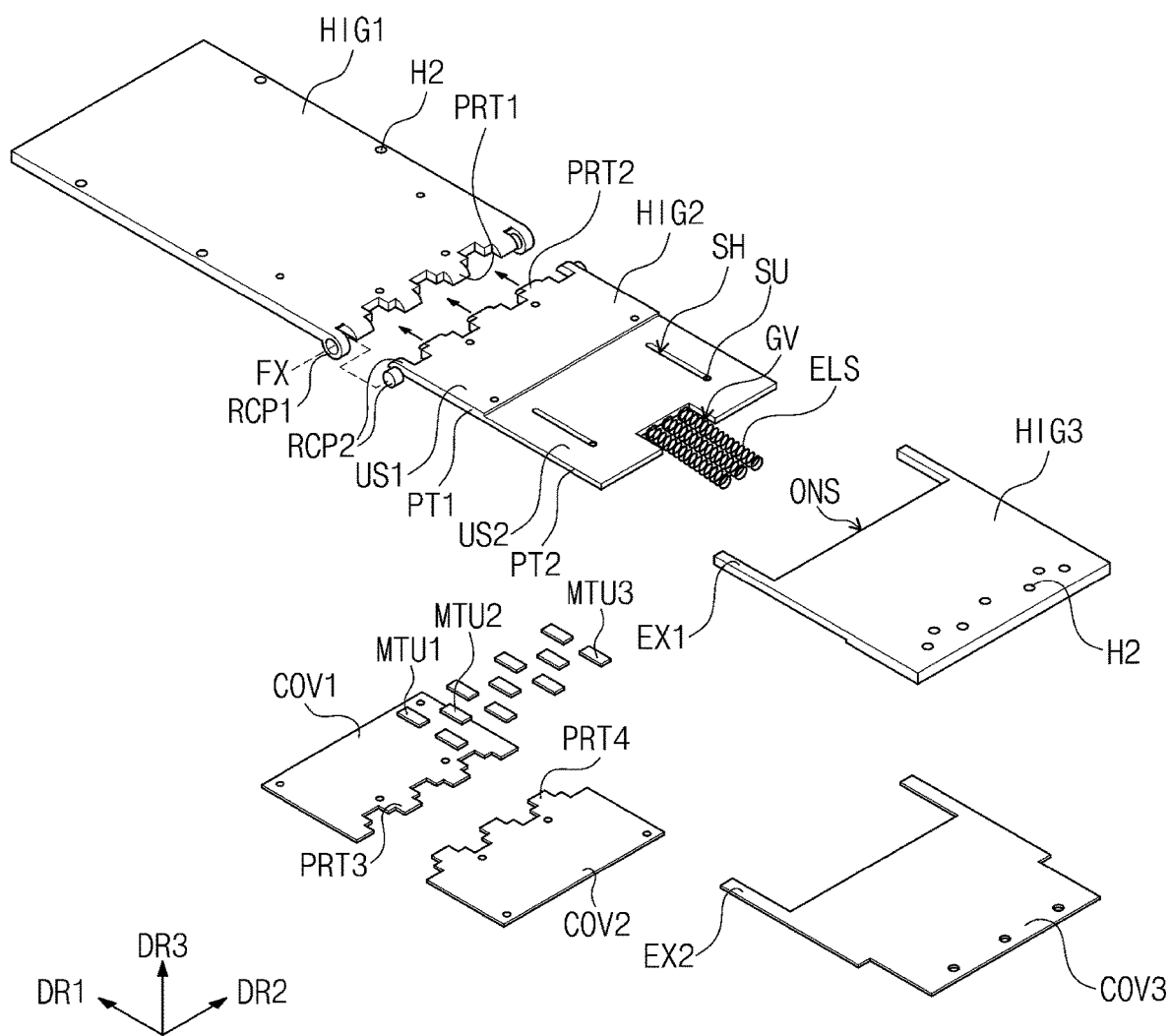
FIG. 9 illustrates an exploded top perspective view showing a hinge depicted FIG. 5.
Figure 10:
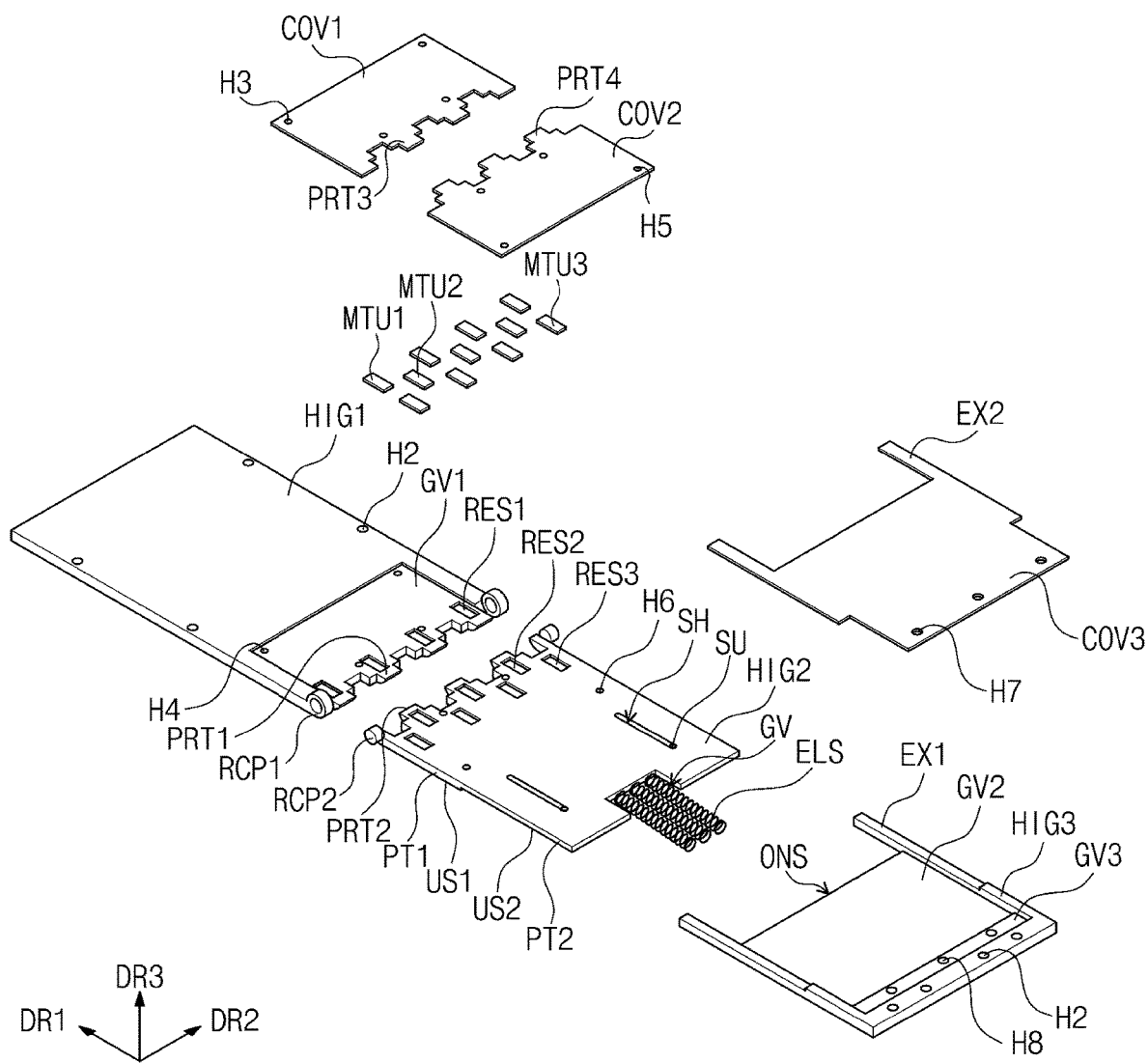
FIG. 10 illustrates an exploded bottom perspective view showing a hinge depicted in FIG. 5.

FIG. 9 illustrates an exploited top perspective view showing the hinge depicted in FIG. 5. FIG. 10 illustrates an exploded bottom perspective view showing the hinge depicted in FIG. 5.

Referring to FIG. 9, the hinge HIG may include the first hinge HIG1, the second hinge HIG2, the third hinge HIG3, a plurality of first protrusions PRT1, a plurality of second protrusions PRT2, a plurality of third protrusions PRT3, a plurality of fourth protrusions PRT4, a plurality of first totaling couplers RCP1, a plurality of second rotating couplers RCP2, a first cover COV1, a second cover COV2, a third cover COV3, a plurality of first extensions EX1, a plurality of second extensions EX2, a plurality of magnetic units MTU1, MTU2, and MTU3, a plurality of sliding units SU, and a plurality of elastic units ELS.

The first hinge HIG1, the second hinge HIG2, and the third hinge HIG3 may have their planes formed by the first and second directions DR1 and DR2. The first hinge HIG1 and the second hinge HIG2 may be rotatably coupled to each other. The folding axis FX may be formed where the first and second hinges HIG1 and HIG2 are couple to each other.

The first protrusions PRT1 may protrude from a first side of the first hinge HIG1 toward the second hinge HIG2, and each of the first protrusions PRT1 may have a stepwise shape. The second protrusions PRT2 may protrude from a first side of the second hinge HIG2 toward the first hinge HIG1, and each of the second protrusions PRT2 may have a stepwise shape. The first protrusions PRT1 may be disposed between the second protrusions PRT2. For example, the first protrusions PRT1 and the second protrusions PRT2 may be alternately arranged.

The first protrusions PRT1 from the first side of the first hinge HIG1 may have distal ends that have shapes that are symmetrical to those of distal ends of the second protrusions PRT2, with respect to a line extending between the ends of the first protrusions and the second protrusions. For example, the shape of the distal ends of the first protrusions PRT1 may be substantially similar to those of the distal ends of the second protrusions PRT2. For example, when viewed along the second direction DR2, the distal ends of the first and second protrusions PRT1 and PRT2 may have convexly curved surfaces each of which corresponds to a substantially quarter circle. The curved surfaces of the distal ends of the first and second protrusions PRT1 and PRT2 may face upwards.

The first rotating couplers RCP1 may protrude from the first side of the first hinge HIG1 and may be disposed on opposite lateral ends in the second direction DR2 of the first hinge HIG1. For example, the plurality of first protrusions PRT1 may be disposed between the first rotating couplers RCP1 protruding from the first side of the first hinge HIG1. The second rotating couplers RCP2 may protrude from the first side of the second hinge HIG2 and may be disposed on opposite lateral ends in the second direction DR2 of the second hinge HIG2. For example, the plurality of second protrusions PRT2 may be disposed between the second rotating couplers RCP2 protruding from the first side of the second hinge HIG2.

The first rotating couplers RCP1 may be rotatably coupled to corresponding second rotating couplers RCP2. Substantially, the first and second hinges HIG1 and HIG2 may be rotatably coupled to each other through the first and second rotating couplets RCP1 and RCP2.

The second hinge HIG2 may include a first part PI1 and a second part PT2. The first part PT1 is adjacent to the first hinge HIG1, and the second part PT2 extends from the first part PT1 and is coupled to the third hinge HIG3. The first side of the second hinge HIG2 may be a first side of the first pail PT1, and the second part PT2 may extend in the first direction DR1 from a second side (e.g., the other side) of the first part PT1 opposite to the first side of the first part PT1.

The second part PT2 may have a thickness in the third direction DR3 that is less than a thickness in the third direction DR3 of the first part PT1. The first part PT1 may have a top surface US1 that is higher than a top surface US2 of the second part PT2. A boundary between the top surfaces US1 and US2 of the first and second parts PT1 and PT2 may extend in the second direction DR2. For example, the boundary may face a side surface ONS of the third hinge HIG3.

The third hinge HIG3 may be slidably coupled in the first direction DR1 to the second part PT2. For example, as the third hinge HIG3 moves along the second part PT2, the third hinge HIG3 may become closer to or farther away from the first part PT1. This configuration will be further discussed in detail below. The first extensions EX1 may extend in the first direction DR1 toward the first hinge HIG1 from opposite lateral ends in the second direction DR2 of the third hinge HIG3. For example, the first extensions EX1 may extend from opposing sides of the third hinge HIG3.

The magnetic units MTU1, MTU2, and MTU3 may include a plurality of first magnetic units MTU1, a plurality of second magnetic units MTU2, and a plurality of third magnetic units MTU3. The first, second, and third magnetic units MTU1, MTU2, and MTU3 may be disposed below the first and second hinges HIG1 and HIG2. Detailed positions of the first, second, and third magnetic units MTU1, MTU2, and MTU3 will be further discussed below with reference to FIG. 10.

The first cover COV1 may be disposed below and coupled to the first hinge HIG1. The third protrusions PRT3 may extend toward the second cover COV2 from a first side of the first cover COV1, and each of the third protrusions PRT3 may have a stepwise shape. For example, the third protrusions PRT3 may extend toward a first side of the second cover COV2 that faces the first side of the first cover COV1. From a plan view, the third protrusions PRT3 may have substantially the same shape as that of the first protrusions PRT1, and may overlap the first protrusions PRT1.

The second cover COV2 may be disposed below and coupled to the second hinge HIG2. The fourth protrusions PRT4 may extend toward the first cover COV1 from the first side of the second cover COV2, and each of the fourth protrusions PRT4 may have a stepwise shape. For example, the fourth protrusions PRT4 may extend toward a first side of the first cover COV1 that facts the first side of the second cover COV2. The fourth protrusions PRT4 may be disposed between the third protrusions PRT3. From a plan view, the fourth protrusions PRT4 may have substantially the same shape as that of the second protrusions PRT2, and may overlap the second protrusions PRT2.

The third cover COV3 may be disposed below and coupled to the third hinge HIG3. The second extensions EX2 may extend in the first direction DR1 toward the first hinge HIG1 from opposite lateral ends in the second direction DR2 of the third cover COV3. The second extensions EX2 may be disposed below corresponding first extensions EX1.

The second part PT2 of the second hinge HIG2 may have sliding holes SH that extend in the first direction DR1. The sliding units SU may be disposed in corresponding sliding holes SH. The sliding units SU may be connected to the third hinge HIG3 when the second part PT2 is coupled to the third hinge HIG3. This configuration will be further discussed in detail below.

The elastic units ELS may be disposed in a groove GV formed on a second side (e.g., the other side) of the second hinge HIG2 opposite to the first side of the second hinge HIG2. The second side of the second hinge HIG2 may be the second side of the second part PT2. The elastic units ELS may be disposed in the groove GV formed on the second side of the second part PT2.

Because what may be perceived as a top surface of each component illustrated in FIG. 10 substantially corresponds to a bottom surface of each component shown in FIG. 9, the top surface of each component will be called a bottom surface in explaining FIG. 10. In other words, FIG. 10 illustrates the bottom surfaces of the components illustrated in FIG. 9.

Referring to FIG. 10. the first hinge HIG1 may have first recessions RES1 formed at its bottom surface adjacent to the first side of the first hinge HIG1. When viewed in plan, the first recessions RES1 may overlap the first protrusions PRT1. The first magnetic units MTU1 may be disposed in the first recessions RES1.

The first cover COV1 may be disposed on the bottom surface of the first hinge HIG1 and may cover the first magnetic units MTU1. The first cover COV1 may be disposed in a first groove GV1 on the bottom surface of the first hinge HIG1, and the first groove GV1 may extend from the first side of the first hinge HIG1 to a certain portion of the first hinge HIG1. The first hinge HIG1 may have the first recessions RES1 on its bottom surface on which the first groove GV1 is provided.

The first cover COV1 may be coupled to the first hinge HIG1. For example, screws may be inserted into third holes H3 formed in the first cover COV1 and into fourth holes H4 formed in the first groove GV1 of the first hinge HIG1, thereby coupling the first cover COV1 to lire first hinge HIG1.

The second hinge HIG2 may have second recessions RES2 formed on its bottom surface adjacent to the first side of the second hinge HIG2. The second recessions RES2 may be disposed staggered with respect to the first recessions RES1. When viewed in plan, the second recessions RES2 may overlap the second protrusions PRT2. The second magnetic units MTU2 may be disposed in the second recessions RES2.

The second hinge HIG2 may have third recessions RES3 formed on its bottom surface adjacent to the second recessions RES2. The third recessions RES3 may be spaced apart from the second protrusions PRT2. The third recessions RES3 may be disposed staggered with respect to the second recessions RES2. For example, the third recessions RES3 may be aligned with the first recessions RES1. The third magnetic units MTU3 may be disposed in the third recessions RES3. The second and third recessions RES2 and RES3 may be formed on the first part PT1 of the second hinge HIG2.

The second cover COV2 may be disposed on the bottom surface of the second hinge HIG2 and may cover the second and third magnetic units MTU2 and MTU3. The second cover COV2 may be coupled to the second hinge HIG2. For example, screws may be inserted into fifth holes H5 formed it the second cover COV2 and into sixth holes H6 formed in the second hinge HIG2, thereby coupling the second cover COV2 to the second hinge HIG2. The second cover COV2 may be coupled to the first part PT1.

A second groove GV2 may be formed in a bottom surface of the third hinge HIG3. The second groove GV2 may extend from the side surface (e.g., a first side surface) ONS of the third hinge HIG3 to a certain portion of the third hinge HIG3. The third hinge HIG3 may have a third groove GV3 formed in its bottom surface adjacent to other side (e.g., a second side surface) of the third hinge HIG3, which is opposite to the first side surface ONS of the third hinge HIG3. When viewing the bottom surface of the third hinge HIG3 from a plan view, the third groove GV3 may be formed higher than the second groove GV2. For example, a depth of the second groove GV2 is greater than that of the third groove GV3.

The second part PT2 may be disposed in the second groove GV2. For example, the second groove GV2 may receive the second side of the second part PT2 and a certain portion of the second part PT2, such that the groove GV formed at the second side and the certain portion adjacent to the second side is received by the second groove GV2. The elastic units ELS may be disposed in the second groove GV2. The third cover COV3 may be disposed on the bottom surface of the third hinge HIG3, thereby covering the elastic units ELS and the second part PT2 disposed in the second groove GV2.

The third cover COV3 may be coupled to the third hinge HIG3. For example, screws may be inserted into seventh holes H7 formed in the third cover COV3 and into eighth holes H8 formed in the third groove GV3 of the third hinge HIG3, thereby coupling the third cover COV3 to the third hinge HIG3.

Figure 11:
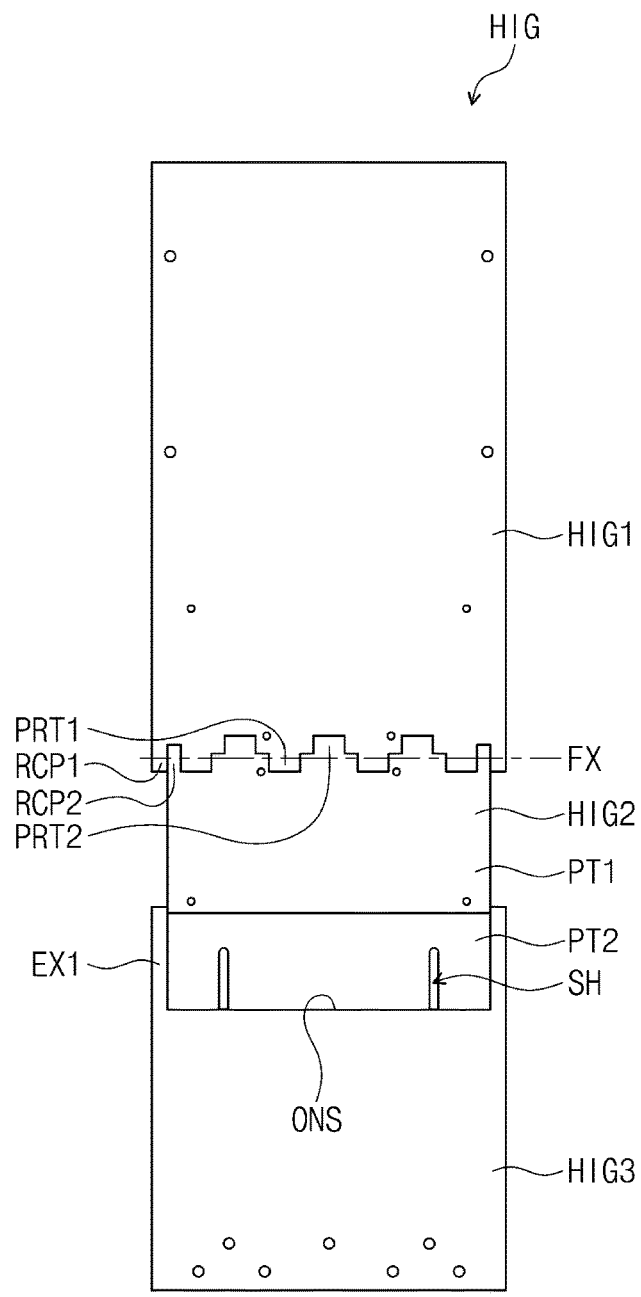
FIG. 11 illustrates a plan view showing a front side of the hinge depicted in FIG. 9.
Figure 11:
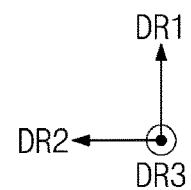

FIG. 11 illustrates a plan view showing a front side of the hinge depicted in FIG. 9.

Referring to FIG. 11, the first hinge HIG1 may be coupled to the second hinge HIG2. The first protrusions PRT1 may be disposed between the second protrusions PRT2, and the first rotating couplers RCP1 may be rotatably coupled to corresponding second rotating couplers RCP2. The second hinge HIG2 may be coupled to the third hinge HIG3. The third hinge HIG3 may receive at least a portion of the second part PT2 of the second hinge HIG2. For example, the portion of the second part PT2 may be inserted into the second groove GV2 illustrated in FIG. 10.

The third hinge HIG3 may be disposed on the second part PT2 and may partially cover the sliding holes SH. The first extensions EX1 may be disposed on opposite side surfaces in the second direction DR2 of the second hinge HIG2.

Figure 12:
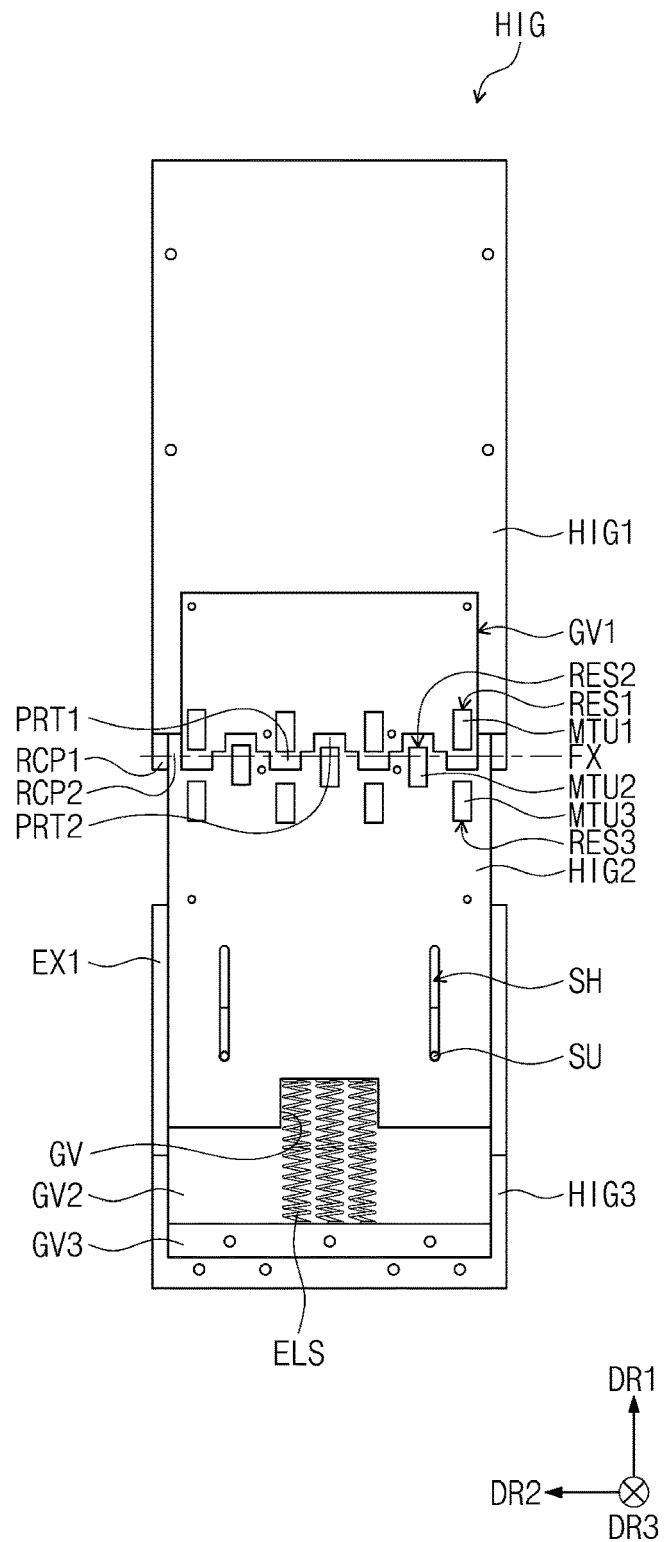
FIGS. 12, 13 and 14 illustrate plan views showing a sequential combination of components of the hinge depicted in FIG. 10.
Figure 13:
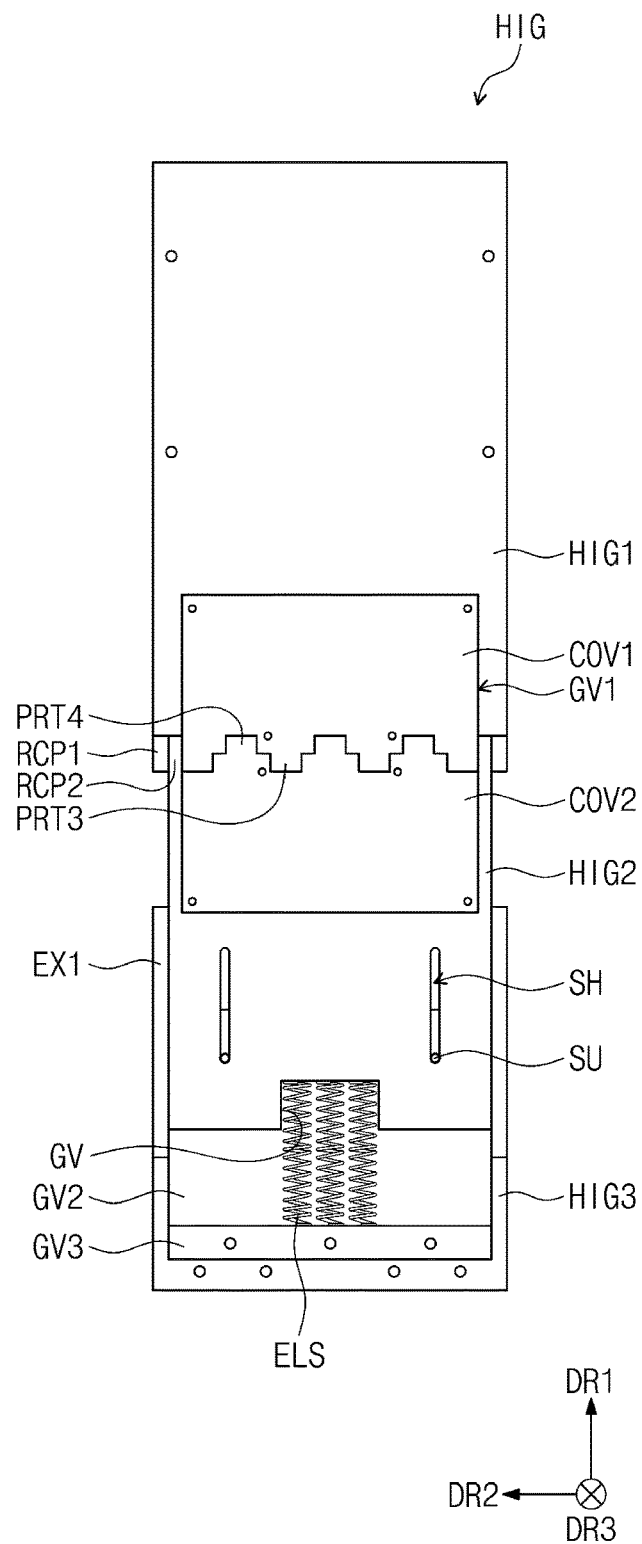
Figure 14:
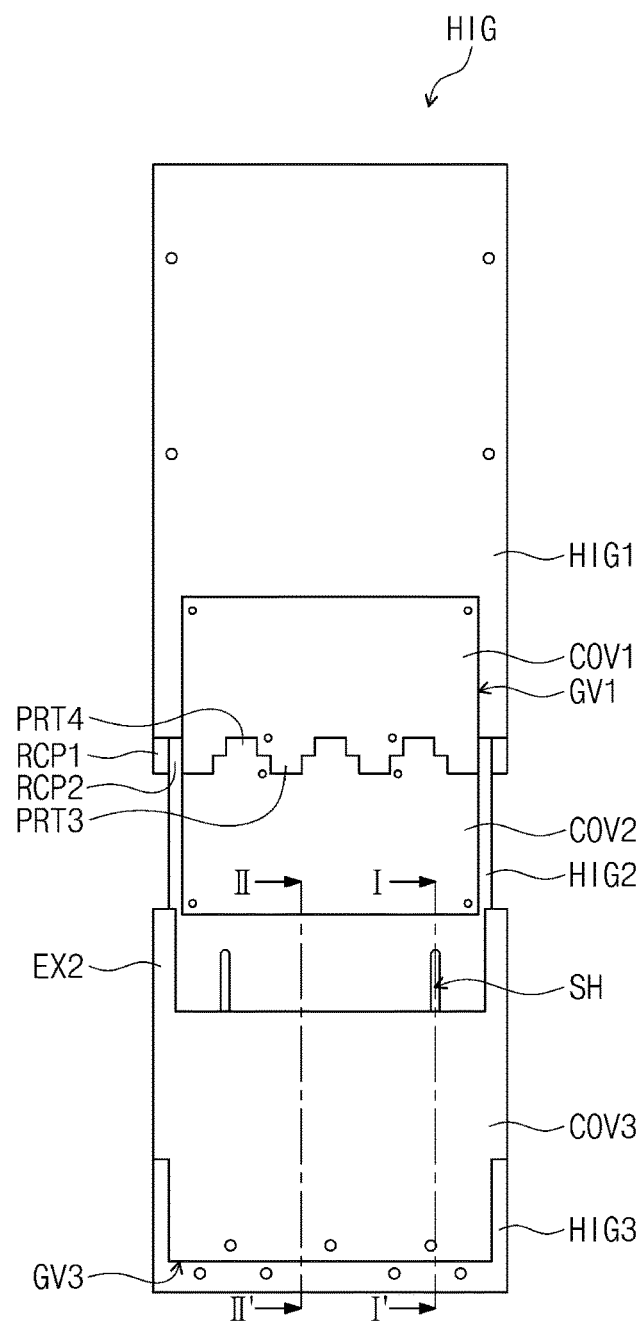
Figure 14:
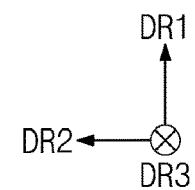

FIGS. 12, 13 and 14 illustrate plan views showing a sequential combination of components of the hinge depicted in FIG. 10.

Referring to FIG. 12, the first magnetic units MTU1 may be disposed on the first hinge HIG1, and the second and third magnetic units MTU2 and MTU3 may be disposed on the second hinge HIG2. For example, as discussed above, the first magnetic units MTU1 may be disposed in the first recessions RES1, the second magnetic units MTU2 may be disposed in the second recessions RES2, and the third magnetic units MTU3 may be disposed in the third recessions RES3.

The first magnetic units MTU1 and the second magnetic units MTU2 may be disposed staggered with respect to each other about the folding axis FX. For example, the folding axis FX may overlap the second magnet units MTU2. The first magnetic units MTU1 may be arranged in the second direction DR2. The second magnetic units MTU2 may be arranged in the second direction DR2.

The third magnetic units MTU3 may be arranged in the second direction DR2. The third magnetic units MTU3 may be disposed adjacent to and staggered with respect to the second magnetic units MTU2. For example, the third magnetic units MTU3 and the second magnetic units MTU2 may be alternately arranged.

The second groove GV2 may receive the elastic units ELS and a portion of the second part PT2 of the second hinge HIG2. The sliding units SU may be disposed in the sliding holes SH. The sliding units SU may be disposed in distal ends of the sliding holes SH, and the distal ends arc adjacent to :he second side of the second part PT2.

Referring to FIGS. 12 and 13, the first cover COV1 may be disposed in the first groove GV1 and may cover the first magnetic units MTU1. The second cover COV2 may be disposed on the bottom surface of the second hinge HIG2 and may cover the second and third magnetic units MTU2 and MTU3. In addition, the first and second covers COV1 and COV2 may allow the first and second hinges HIG1 and HIG2 to receive therein the first, second, and third magnetic units MTU1, MTU2, and MTU3.

Referring to FIGS. 13 and 14, the third cover COV3 may be disposed on the bottom surface of the third hinge HIG3, thereby covering the elastic units ELS and the second part PT2 disposed in the second groove GV2. In addition, the third cover COV3 may allow the third hinge HIG3 to receive therein the elastic units ELS and a portion of the second part PT2.

The third cover COV3 may have a portion which is adjacent to a bottom end of the third cover COV3 and is connected to the third hinge HIG3. The third cover COV3 may be disposed on a bottom surface of the second part PT2, thereby partially covering the sliding holes SH. The third cover COV3 may be disposed on the bottom surface of the second part PT2, thereby covering the sliding units SU.

Figure 15:
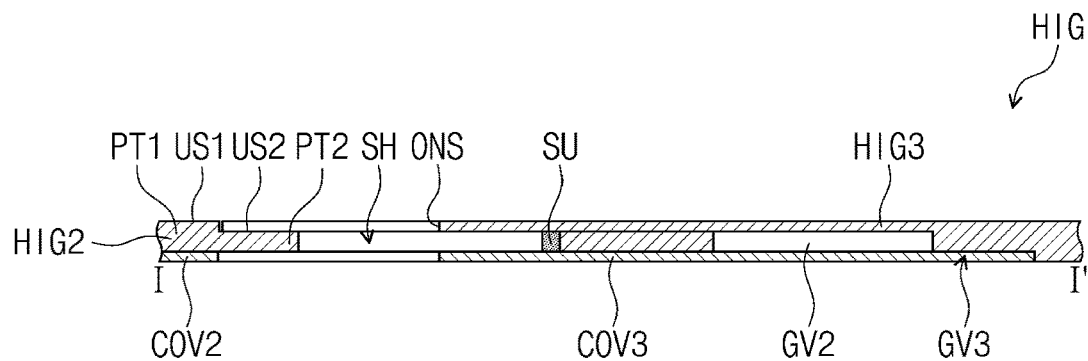
FIG. 15 illustrates a cross-sectional view taken along line I-I' depicted in FIG. 14.
Figure 15:
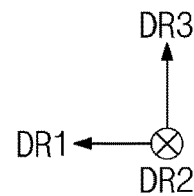
Figure 16:
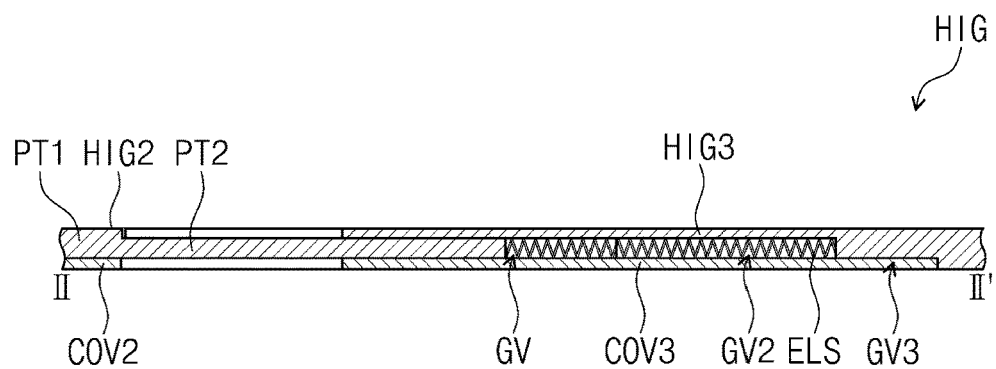
FIG. 16 illustrates a cross-sectional view taken along line II-II' depicted in FIG. 14.
Figure 16:
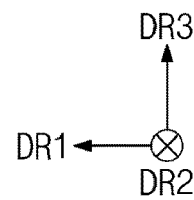

FIG. 15 illustrates a cross-sectional view taken along line I-I' of FIG. 14. FIG. 16 illustrates a cross-sectional view taken along line II-II' of FIG. 14.

For convenience of description, the cross-sectionals views of FIGS. 15 and 16 show the hinge whose upper portion faces upwards.

Referring to FIG. 15, the sliding unit SU at a right-side end of the sliding hole SH may be disposed between the third hinge HIG3 and the third cover COV3. The sliding unit SU may be connected to the third hinge HIG3 and the third cover COV3. The sliding unit SU may not be connected to the second part PT2 of the second hinge HIG2.

Because the sliding unit SU is not connected to the second part PT2, the sliding unit SU, together with the third hinge HIG3 and the third cover COV3. may reciprocally move in the first direction DR1 along the sliding hole SH.

Referring to FIGS. 15 and 16, the elastic unit ELS (e.g., a spring) on the groove GV of the second part PT2 may be disposed to an end of the second groove GV2. The elastic unit ELS may push the third hinge HIG3 and the third cover COV3 in the first direction DR1 (or, e.g., an outward direction) away from a center of the hinge HIG.

Because the elastic unit ELS pushes the third hinge HIG3 and the third cover COV3 in the outward direction away from the second hinge HIG2, the sliding unit SU may move in the outward direction (e.g., along the first direction DR1) and may then be disposed at a rightmost side of the sliding hole SH.

Figure 17:
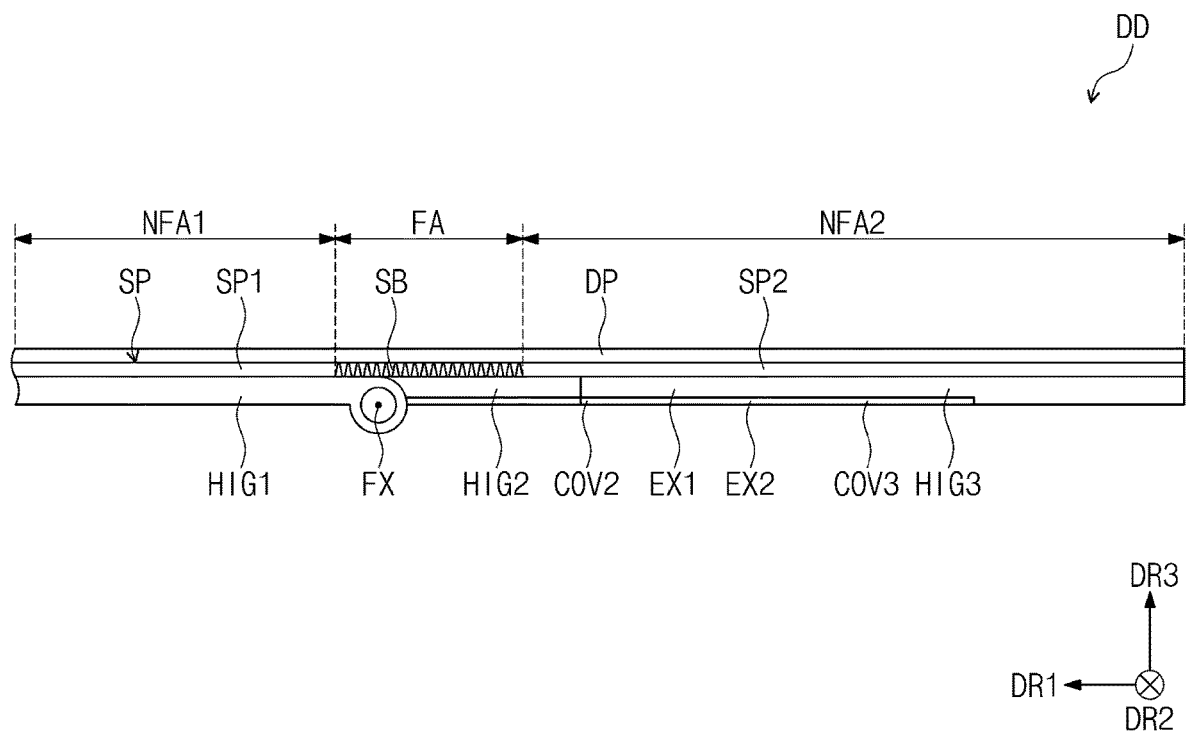
FIG. 17 illustrates a side view showing the display device depicted in FIG. 5.
Figure 18:
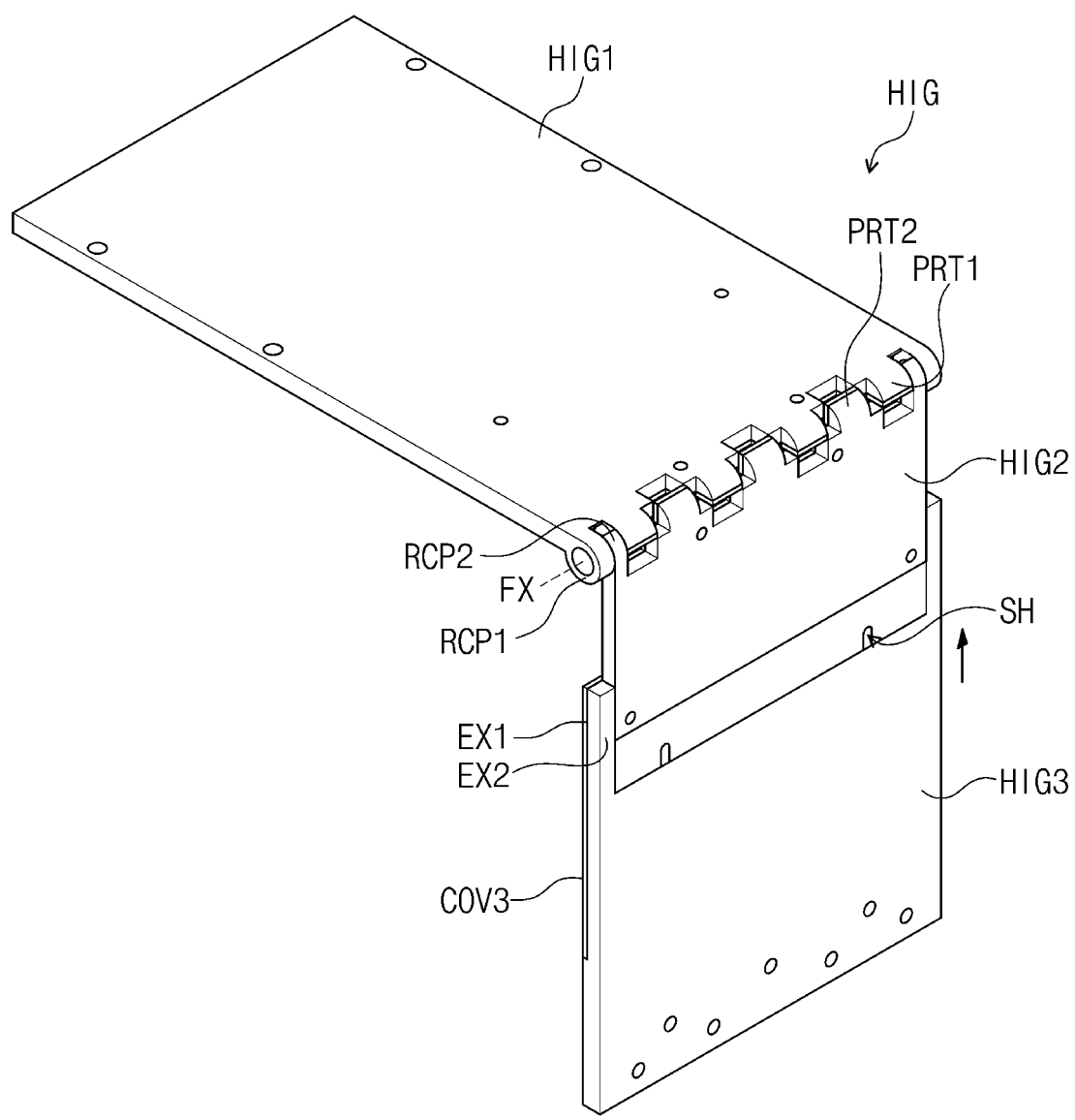
FIG. 18 illustrates a perspective view showing rotation of the hinge depicted in FIG. 5.
Figure 19:
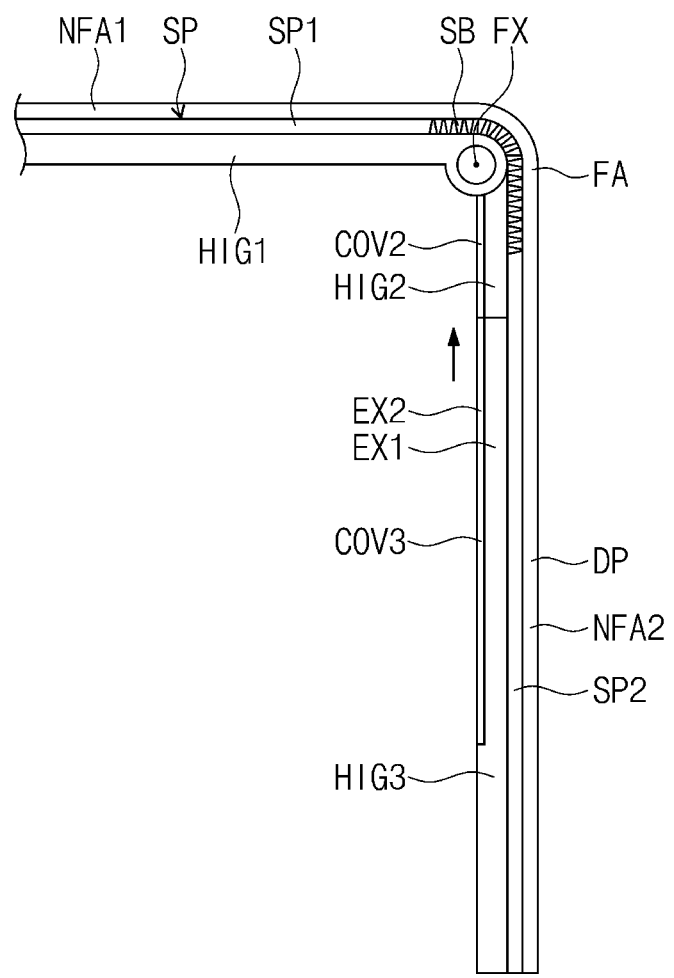
FIGS. 19 and 20 illustrate cross-sectional views showing a folding operation of the display device depicted in FIG. 17.
Figure 20:
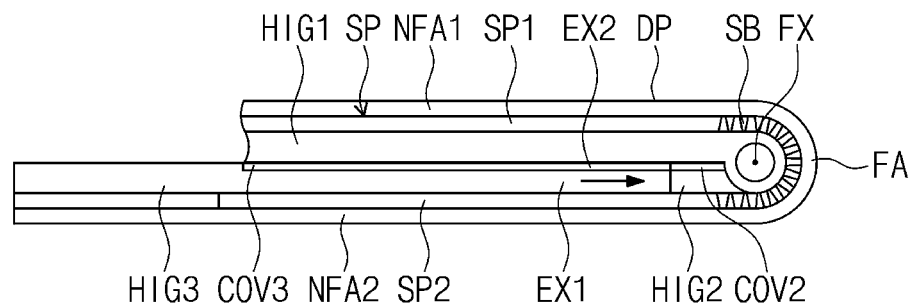
Figure 20:
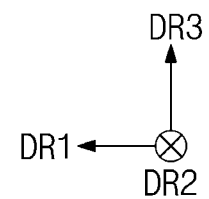

FIG. 17 illustrates a side view of the display device depicted in FIG. 5. FIG. 18 illustrates a perspective view showing a rotation of the hinge depicted in FIG. 5. FIGS. 19 and 20 illustrate cross-sectional views showing a folding operation of the display device depicted in FIG. 17.

FIG. 17 shows the hinge HIG, the supporter SP, and the display panel DP which are coupled to each other. FIGS. 15 and 16 will be discussed in the following description.

Referring to FIG. 17, the supporter SP may be disposed on the hinge HIG, and the display panel DP may be disposed on the supporter SP. FIG. 17 shows an unfolded state of the display device DD in which the hinge HIG, the supporter SP, and the display panel DP may be maintained in a fiat state.

When viewed along the second direction DR2, the support bars SB may have inverse trapezoidal shapes. The support bars SB may overlap the folding axis FX. The support bars SB may be disposed on a portion of the first hinge HIG1 and a portion of the second hinge HIG2, and both portions of the first hinge HIG1 and the second hinge HIG2 arc adjacent to the folding axis FX.

When the hinge HIG maintains a fiat state without being folded, as shown in FIG. 16, the elastic unit ELS may push the third hinge HIG3 and the third cover COV3 in the outward direction. In addition, when the hinge HIG maintains a fiat state without being folded, as shown in FIG. 15, the sliding unit SU may be disposed at a rightmost side of the sliding hole SH.

Referring to FIGS. 18, 19, and 20, the hinge HIG may rotate about the folding axis FX, and then may be in a folded state. The supporter SP and the display panel DP may be folded by the hinge HIG.

Because the first hinge HIG1 is connected to the first supporter SP1, and because the third hinge HIG3 is connected to the second supporter SP2, the supporter SP may be folded when the hinge HIG is folded. Because the display panel DP is connected to the supporter SP, the folding of the supporter SP may induce folding of the display panel DP. The display device DD may be cut-folded to externally expose a top surface thereof.

Figure 21:
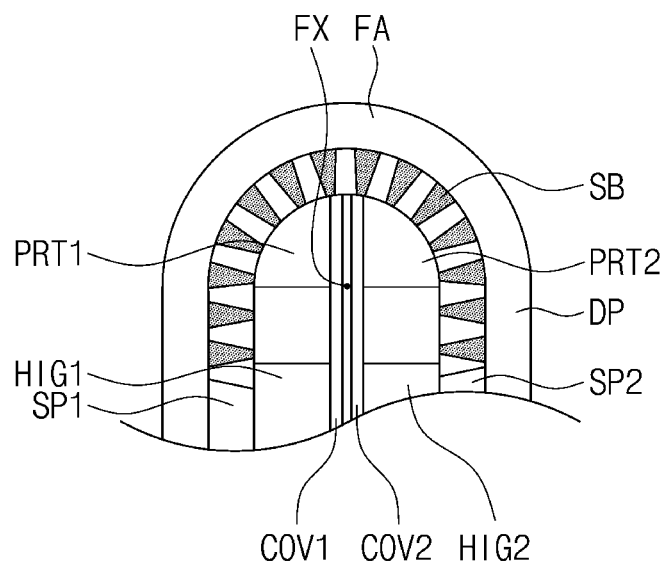
FIG. 21 illustrates an enlarged cross-sectional view showing a first protrusion and a second protrusion of a hinge that overlaps a folding area depicted in FIG. 20.

FIG. 21 illustrates an enlarged cross-sectional view showing the first protrusion and the second protrusion of the hinge that overlaps the folding area depicted in FIG. 20.

FIG. 21 shows, as an example, side surfaces of the first and second protrusions PRT1 and PRT2 when viewed along the second direction DR2.

Referring to FIG. 21, because the first protrusion PRT1 and the second protrusion PRT2 are each shaped like a substantially quarter circle, when the display device DD is folded, the first protrusion PRT1 and the second protrusion PRT2 may become adjacent to each other to form a substantially semicircular shape. The support bars SB may be disposed on the first and second protrusions PRT1 and PRT2 that form the semicircular shape.

Figure 22:
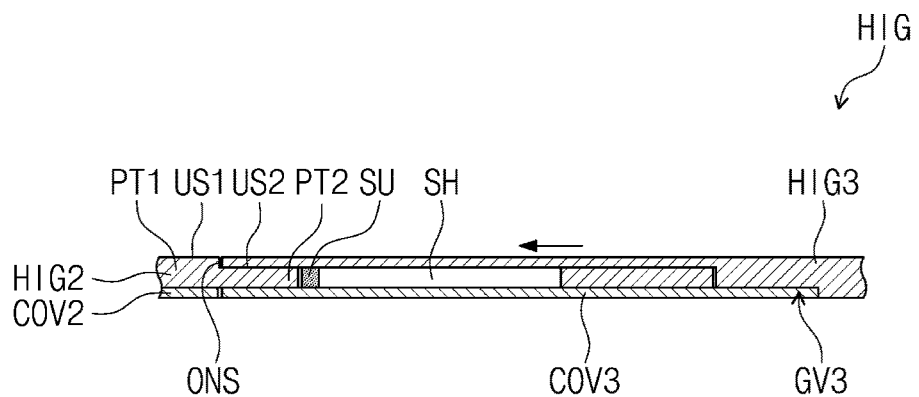
FIG. 22 illustrates a cross-sectional view showing movement of a sliding unit in the display device which is folded as depicted in FIG. 20.
Figure 22:
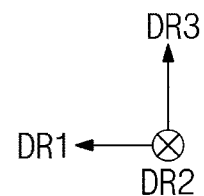
Figure 23:
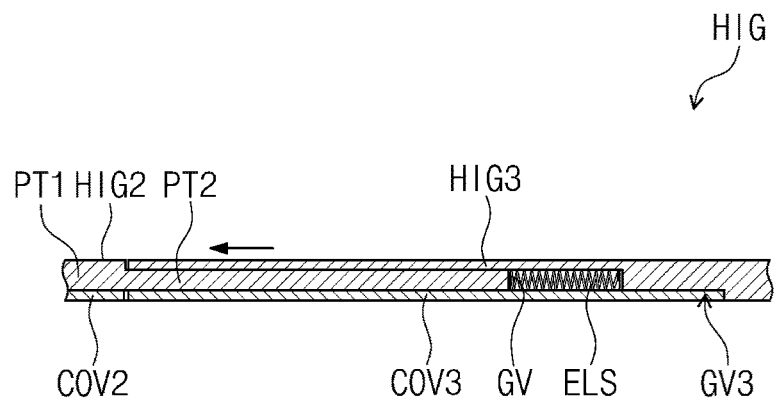
FIG. 23 illustrates a cross-sectional view showing movement of an elastic unit in the display device which is folded as depicted in FIG. 20.
Figure 23:
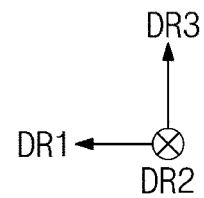

FIG. 22 illustrates a cross-sectional view showing movement of the sliding unit in the display device which is folded as depicted in FIG. 20. FIG. 23 illustrates a cross-sectional view showing movement of the elastic unit in the display device which is folded as depicted in FIG. 20.

FIG. 22 shows a cross-sectional view corresponding to that of FIG. 15. FIG. 23 shows a cross-sectional view corresponding to that of FIG. 16. FIGS. 19 and 20 will be discussed in the following description.

Referring to FIGS. 19, 20, and 22, when the display device DD is folded, the third hinge HIG3 connected to the second supporter SP2 and the third cover COV3 connected to the third hinge HIG3 may slide along the second hinge HIG2, thereby moving toward a center (e.g., the folding axis FX) of the display device DD.

The sliding unit SU connected to the third hinge HIG3 and the third cover COV3 may move in the first direction DR1 along the sliding hole SH, thereby being disposed at a left side of the sliding hole SH, when the display device DD is folded. For example, the side surface ONS of the third hinge HIG3 may be adjacent to the boundary between the top surfaces US1 of the first part PT1 and the top surface US2 of the second part PT2.

Referring to FIG. 23, when the display device DD is folded, the third hinge HIG3 and the third cover COV3 may move toward the center of the display device DD. and therefore the elastic unit ELS may contract toward the center of the display device DD.

When the display device DD is unfolded again as shown in FIG. 17, the elastic unit ELS may push the third hinge HIG3 and the third cover COV3 in the outward direction. In addition, the sliding unit SU may slide along the sliding hole SH and may then be disposed at a rightmost side of the sliding hole SH.

Figure 24:
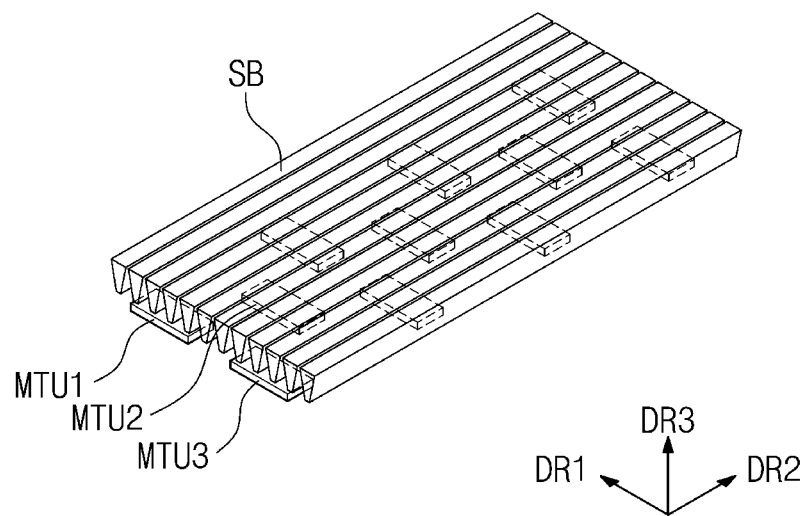
FIG. 24 illustrates a perspective view showing magnetic units of FIG. 9 and support bars of FIG. 17.
Figure 25:
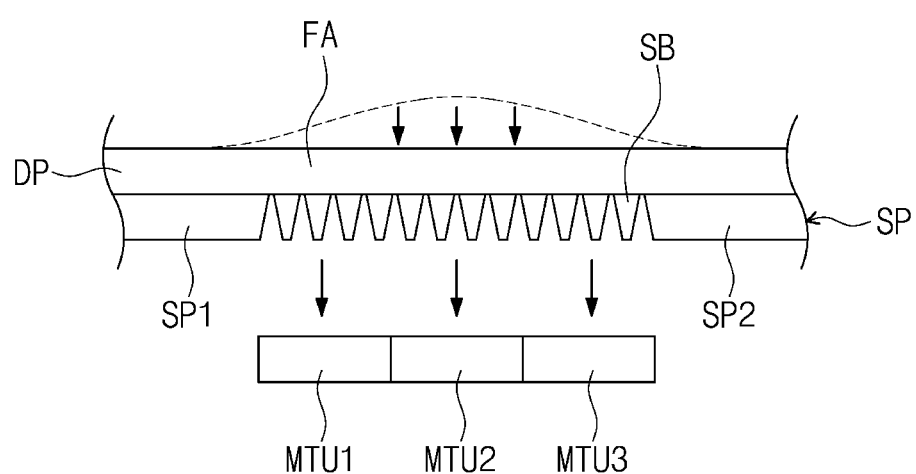
FIG. 25 illustrates a side view showing magnetic units of FIG. 9, a folding area of FIG. 17, and support bars of FIG. 17.

FIG. 24 illustrates a perspective view showing the magnetic units of FIG. 9 and the support bars of FIG. 17. FIG. 25 illustrates a side view showing the magnetic units of FIG. 9, the folding area of FIG. 17, and the support bars of FIG. 17.

Referring to FIGS. 24 and 25, the first, second, and third magnetic units MTU1, MTU2, and MTU3 may be disposed below the support bars SB. When the folding area FA is repeatedly folded and unfolded, the folding area FA may be convexly deformed upwards as expressed by a dotted line illustrated in FIG. 25.

In an embodiment of the present invention, the support bars SB may be downwardly pulled by magnetic forces from the first, second, and third magnetic units MTU1, MTU2, and MTU3. Therefore, the biding area FA attached to the support bars SB may be downwardly pulled, and as a result, the folding area FA may be prevented from being deformed.

The second magnetic units MTU2 may be disposed staggered with respect to the first magnetic units MTU1. and the third magnetic units MTU3 may be disposed staggered with respect to the second magnetic units MTU2. In this case, the support bars SB may be supplied with substantially uniform magnetic forces from the first, second, and third magnetic units MTU1, MTU2, and MTU3, which may downwardly pull the support bars SB and the folding area FA connected to the support bars SB.

In consequence, the display device DD according to an embodiment of the present invention may prevent the display panel DP from being deformed at the folding area FA.

The out-foldable display device DD is explained as an example, but the magnetic units MTU1, MTU2, and MTU3 according to an embodiment of the present invention may also be applicable to an in-foldable display device whose display surface is not externally exposed during a folding operation. An in-foldable display panel may also be deformed at a folding area thereof, but when the magnetic units MTU1, MTU2. and MTU3 arc disposed on the folding area the deformation of the folding area may be prevented similarly to the out-foldable display device DD.

A display device according to an embodiment of the present invention may include a plurality of magnetic units that overlap a folding area of a display panel, and the magnetic units may pull the folding area, which may result in the folding area maintaining its flat state. Accordingly, the folding area may be prevented from being deformed.

While the present invention has been described with reference to embodiments thereof, it will be understood by those of ordinary skill in the art that various changes in form and details may be made thereto without departing from the spirit and scope of the present invention.

What is claimed is:

1. A display device, comprising:
   a display panel including a folding area;
   a supporter disposed on the display panel, wherein the supporter includes a plurality of support bars that are arranged in a first direction and extend in a second direction intersecting the first direction:
   a hinge disposed on the supporter, wherein the hinge has a folding axis that overlaps the folding area and extends in the second direction; and
   a plurality of first magnetic units and a plurality of second magnetic units disposed on the supporter, wherein the first magnetic units and the second magnetic units overlap the folding area,
   wherein the first magnetic units and the second magnetic units are staggered with respect to each other, wherein the folding axis is between the first magnetic units and the second magnetic units.

2. The display device of claim 1, wherein the first magnetic units and the second magnetic units are arranged in the second direction.

3. The display device of claim 1, further comprising a plurality of third magnetic units that are adjacent to the second magnetic units, wherein the second magnetic units and the third magnetic units are staggered with respect to each other.

4. The display device of claim 1, wherein the support bars include a metal material.

5. The display device of claim 1, wherein
   the display panel further includes a first non-folding area and a second non-folding area, wherein the folding area is disposed between the first non-folding area and the second non-folding area, and
   the supporter further includes a first supporter and a second supporter that respectively overlap the first non-folding area and the second non-folding area, wherein the support bars are disposed between the first supporter and the second supporter.

6. The display device of claim 5, wherein the hinge includes:
   a first hinge is disposed on the first supporter, wherein the first magnetic units are disposed on the first hinge;
   a second hinge which is disposed on the second supporter, wherein the second magnetic units are disposed on the second hinge, wherein the second hinge and the first hinge are rotatably coupled to each other to form the folding axis; and
   a third hinge disposed on the second supporter, wherein the third hinge is spaced apart from the first hinge and is slidably coupled in the first direction to the second hinge.

7. The display device of claim 6, wherein
   the first supporter is connected to the first hinge, and
   the second supporter is connected to the third hinge.

8. The display device of claim 6, further comprising:
   a plurality of first protrusions that protrude from a first side of the first hinge, wherein the first side of the first hinge faces the second hinge;
   a plurality of second protrusions that protrude from a first side of the second hinge, wherein the first side of the second hinge faces the first side of the first hinge;
   a plurality of first rotating couplers that protrude from the first side of the first hinge; and
   a plurality of second rotating couplers that protrude from the first side of the second hinge,
   wherein the first protrusions are between the second protrusions, and
   wherein the first rotating couplers are rotatably coupled to the second rotating couplers, respectively.

9. The display device of claim 8, wherein ends of the first protrusions have convexly curved surfaces that are symmetrical to convexly curved surfaces of ends of the second protrusions, with respect to a line extending between the ends of the first protrusions and the second protrusions.

10. The display device of claim 8, wherein the first magnetic units are in a plurality of first recessions formed in a bottom surface of the first hinge, wherein the bottom surface of the first hinge is adjacent to the first side of the first hinge.

11. The display device of claim 10, further comprising a first cover that is disposed on the first hinge and covers the first magnetic units.

12. The display device of claim 10, wherein the second magnetic units are in a plurality of second recessions formed in a bottom surface of the second hinge, wherein the bottom surface of the second hinge is adjacent to the first side of the second hinge.

13. The display device of claim 12, wherein
   the first recessions overlap the first protrusions, and
   the second recessions overlap the second protrusions.

14. The display device of claim 12, further comprising a second cover that is disposed on the second hinge and covers the second magnetic units.

15. The display device of claim 8, wherein the second hinge includes:
   a first part adjacent to the first hinge and including a first side and a second side opposite the first side, wherein the first side of the first part faces the first hinge; and a second part that extends in the first direction from the second side of the first part,
wherein
the third hinge is slidably coupled to the second part of the second hinge,
a top surface of the first part is higher than a top surface of the second part, and
a boundary between the top surfaces of the first and second parts faces a side surface of the third hinge.

16. The display device of claim 15, wherein a portion of the second part is in a second groove in a bottom surface of the third hinge.

17. The display device of claim 16, further comprising a plurality of elastic units disposed in a groove formed in a first side of the second part and in the second groove,
wherein the first side of the second part, opposite to the second side of the first part, is disposed in the second groove.

18. The display device of claim 17, further comprising a third cover disposed on the third hinge and covering the elastic units and the second part of the second hinge disposed in the second groove of the third hinge.

19. The display device of claim 18, further comprising a sliding unit disposed in a sliding hole that is formed in the second part of the second hinge and extends in the first direction,
wherein the sliding unit is disposed between the third hinge and the third cover and is connected to the third hinge and the third cover.

20. The display device of claim 1, wherein the hinge folds the supporter and the display panel about the folding axis such that a display surface faces away from itself, wherein the display surface is a top surface of the display panel.

* * * * *